United States Patent [19]
Lee et al.

[11] Patent Number: 6,122,397
[45] Date of Patent: Sep. 19, 2000

[54] METHOD AND APPARATUS FOR MASKLESS SEMICONDUCTOR AND LIQUID CRYSTAL DISPLAY INSPECTION

[75] Inventors: Shih-Jong J. Lee, Bellevue; Alan C. Nelson, Redmond, both of Wash.

[73] Assignee: Tri Path Imaging, Inc., Redmond, Wash.

[21] Appl. No.: 08/888,115

[22] Filed: Jul. 3, 1997

[51] Int. Cl.⁷ ...................................................... G06K 9/00
[52] U.S. Cl. .......................... 382/149; 382/141; 382/225; 382/308
[58] Field of Search ................................ 382/141, 144, 382/145, 149, 204, 225, 308; 348/125, 126, 129, 130; 345/904

[56] References Cited

U.S. PATENT DOCUMENTS

| | | | |
|---|---|---|---|
| 4,712,248 | 12/1987 | Hongo | 382/22 |
| 4,805,123 | 2/1989 | Specht et al. | 364/559 |
| 4,876,728 | 10/1989 | Roth | 382/21 |
| 5,012,524 | 4/1991 | Le Beau | 382/8 |
| 5,163,128 | 11/1992 | Straayer | 382/147 |
| 5,315,700 | 5/1994 | Johnston et al. | 395/163 |
| 5,361,140 | 11/1994 | Hayenga et al. | 358/446 |
| 5,499,097 | 3/1996 | Ortyn et al. | 356/372 |
| 5,506,793 | 4/1996 | Straayer et al. | 364/571.01 |
| 5,515,453 | 5/1996 | Hennessey et al. | 382/141 |
| 5,528,703 | 6/1996 | Lee | 382/257 |
| 5,557,097 | 9/1996 | Ortyn et al. | 250/201.3 |
| 5,581,631 | 12/1996 | Ortyn et al. | 382/128 |
| 5,619,428 | 4/1997 | Lee et al. | 364/551.01 |
| 5,621,519 | 4/1997 | Frost et al. | 356/124.5 |
| 5,625,706 | 4/1997 | Lee et al. | 382/128 |
| 5,627,908 | 5/1997 | Lee et al. | 382/133 |
| 5,638,459 | 6/1997 | Rosenlof et al. | 382/133 |
| 5,640,464 | 6/1997 | Ebel et al. | 382/143 |
| 5,642,433 | 6/1997 | Lee et al. | 382/199 |
| 5,642,441 | 6/1997 | Riley et al. | 382/255 |
| 5,647,025 | 7/1997 | Frost et al. | 382/255 |
| 5,699,447 | 12/1997 | Alumot et al. | 382/145 |

OTHER PUBLICATIONS

Marr, D. and Hildreth, H, "Theory on Edge Detection," Proc. Roy. Soc. London, vol. B207: 187–217, 1980.

Rosenfeld, A. Ed., "Multiresolution Image Processing and Analysis," New York: Springer–Verlag, 1984.

Serra, J, "Image analysis and mathematical morphology," London: Academic, 1982.

Devijer P., Kittler J: "Pattern Recognition. A Statistical Approach." Prentice Hall, Englewood Cliffs, London, 1982.

Ikeda S., Ochiai, M, Sawaragi, Y. "Sequential GMDH Alhgorithm and Its Application to River Flow Prediction" IEEE Trans. Syst. Man Cybern. SMC–6(7) :473–479.

Hart P.:"The Condensed Nearest Neighbor Rule." IEEE Transactions on Information Theory 14, 515–516, 1968.

(List continued on next page.)

*Primary Examiner*—Bhavesh Mehta
*Attorney, Agent, or Firm*—Hans Sun; Emil Moffa; George Leone

[57] ABSTRACT

Image primitive based maskless semiconductor wafer and liquid crystal display panel inspection by the characterization of wafer patterns. Potential defects are detected as exceptions to the rules of general semiconductor surface pattern structure. The wafer or liquid crystal display, lcd, structure is encoded into multiple profiles of a set of primitive characterization modules. Primitive profiles are correlated with potential defects along with aligned pattern images for surface component to surface component, lcd active matrix element to lcd active matrix element, comparison and further refines the results using data from multiple surface components or lcd active matrix elements. Multiple stage defect classification is applied to the potential defects to reject false defects. Multiple layer correlation and automatic learning enhance and tailor detection rules during a ramp-up stage. There is a dramatic reduction of false and nuisance defects and a high sensitivity to critical defects. The highly robust method is not sensitive to factors such as metal grain structure and imperfect alignment. Automatic learning tailors the inspection system for a specific semiconductor surface design and manufacturing process.

53 Claims, 13 Drawing Sheets othpub

Kohonen T., "The Self–organizing Map." Proceedings of the IEEE 78, 1464–1480, 1990.

Geva S. and Sitte J. "Adaptive nearest neighbor pattern Classification." IEEE Transactions on Neural Networks 2, 318–322, 1991.

Lee, JSJ and Lin, C, "A Pipeline Architecture for Real–Time Connected Components Labeling", Proc. SPIE Advances in Intellige. Robotics Systems, Nov. 1988.

Bartels PH:"Numerical Evaluation of Cytologic Data: VII. Multivariate Significance Tests", Analyt. Quant. Cytol. 3:1–8, 1981.

Breiman et al.:"Classification and Regression Trees", Belmont, California, Wadsworth, 1984.

Acharya et al., "Mathematical Morphology for 3–D Image Analysis", 1988 International Conference on Acoustics, Speech, and Signal Processing, pp. 952–955, ©1988 IEEE.

Adelson et al., "Modeling the human visual system", RCA Engineer, 27:6, Nov./Dec. 1982, pp. 56–64.

Adelson et al., "Orthogonal pyramid transforms for image coding", SPIE vol. 845 Visual Communications and Image Processing II (1987), pp. 50–58.

Burt, Peter J., "Fast Filter Transforms for Image Processing", ©1981 by Academic Press, Inc., Computer Graphics and Image Processing, vol. 16, pp. 20–51 (1981).

Burt et al., "The Laplacian Pyramid as a Compact Image Code", ©1983 IEEE, IEEE Transactions on Communications, 31:4, Apr. 1983, pp. 532–540.

Campbell et al., "Application of Fourier Analysis to the Visibility of Gratings", J. Physiol. 1968, 197, pp. 551–567.

Esteban et al., "Application of Quadrature Mirror Filters to Split Band Voice Coding Schemes", IBM Laboratory, 06610 La Gaude, France, pp. 191–195.

Gharavi et al., "Application of Quadrature Mirror Filtering to the Coding of Monochrome and Color Images", ©1987 IEEE, pp. 2384–2387.

Lee et al., "A Novel Approach to Real–Time Motion Detection", ©1988 IEEE, pp. 730–735.

Lee et al., "A Processing Strategy for Automated Papanicolaou Smear Screening", ©The International Academy of Cytology, Analytical and Quantitative Cytology and Histology, 14:5, Oct. 1992, pp. 415–425.

Lee et al., "Adaptive Image Processing Techniques", SPIE vol. 848, Intelligent Robots and Computer Vision: Sixth in a Series (1987) pp. 255–262.

Lee et al., "Morphologic Edge Detection", ©1987 IEEE, IEEE Journal of Robotics and Automation, vol. RA–3, No. 2, Apr. 1987, pp. 142–156.

Maragos, Petros, "Pattern Spectrum and Multiscale Shape Representation", ©1989 IEEE, IEEE Transactions on Pattern Analysis and Machine Intelligence, 11:7, Jul. 1989, pp. 701–716.

Sternberg, Stanley R., "Grayscale Morphology", Computer Vision, Graphics and Image Processing 35, pp. 333–355 (1986).

Watson, Andrew B., "The Cortex Transform: Rapid Computation of Simulated Neural Images", Computer Vision, Graphics and Image Processing, 39, pp. 311–327 (1987).

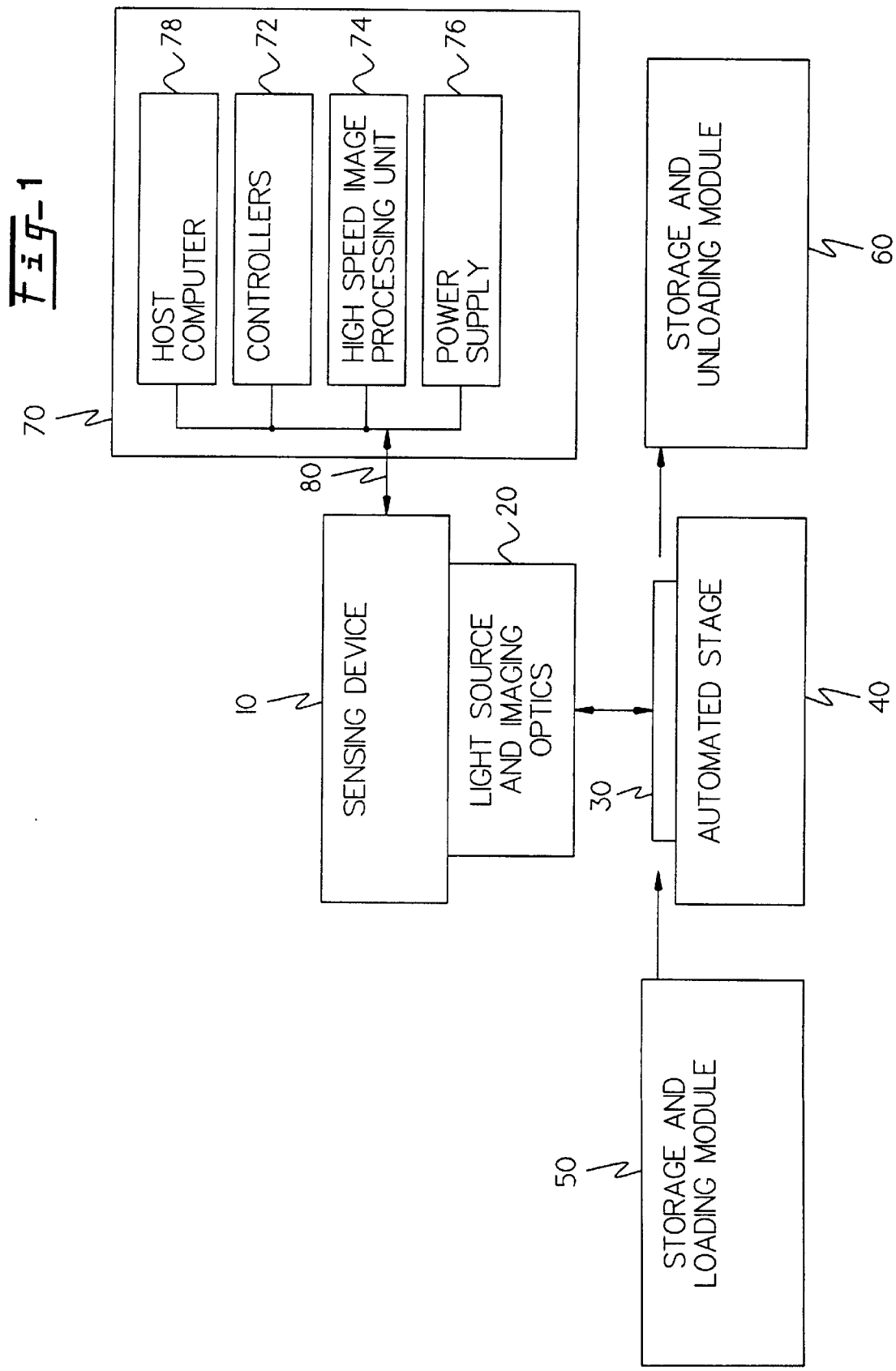

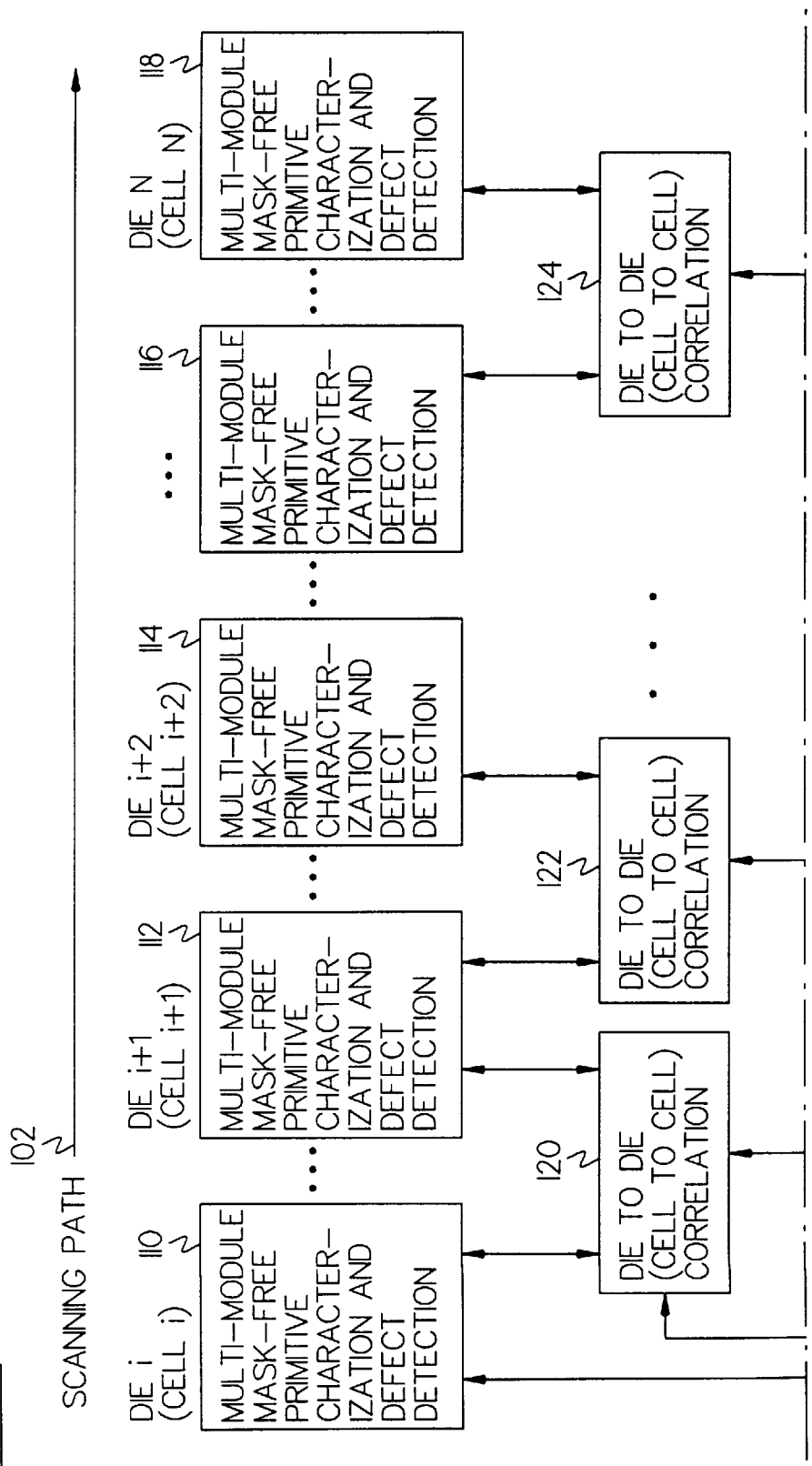

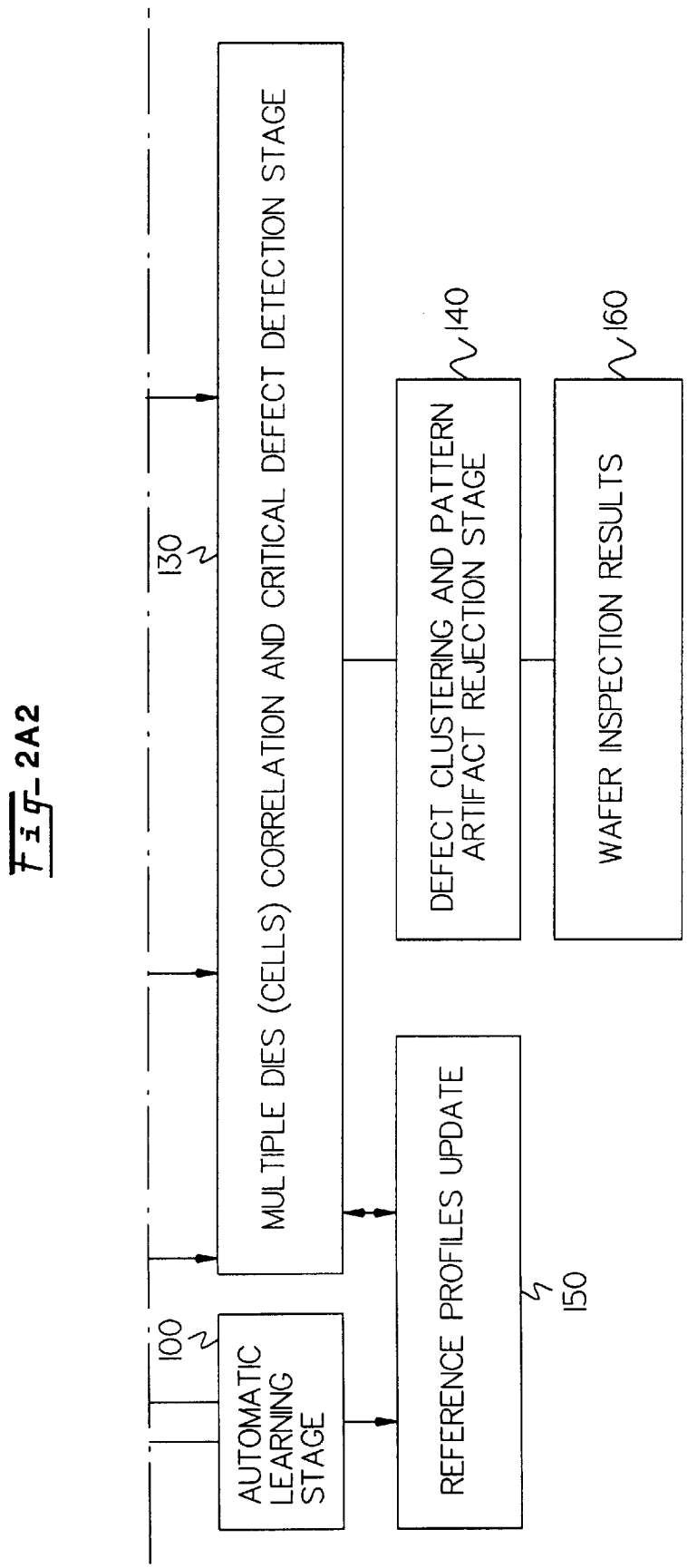

METHOD AND APPARATUS FOR MASKLESS SEMICONDUCTOR AND LIQUID CRYSTAL DISPLAY INSPECTION

The invention relates to a method and apparatus for defect detection, and more particularly to a method and apparatus for maskless semiconductor and liquid crystal display inspection.

BACKGROUND OF THE INVENTION

The drive by semiconductor manufacturers to smaller feature sizes with improved yield in semiconductor fabrication and Liquid Crystal Display (LCD) fabrication places greater challenges on identifying and resolving defects on surface components. For example, defect detection, classification, and effective use of defect data are essential for yield learning during ramp-up and for process control during production. The challenge of improving and maintaining yields continues to grow as device sizes become smaller, the number of surface components on each wafer increase, and the structure of circuit designs becomes more complex on more layers.

While particulate contamination limits yield, as design rules go below 0.35 mm, process defects do at least as much to limit yields. Differentiating critical defects from nuisance defects, identifying process problems and predicting yield impacts all need to be assessed in near real time to prevent yield busts or yield catastrophes. Semiconductor manufacturing requires improved defect detection, classification, and data handling technologies to meet the increasing standards. Types of macro and micro defects include: Gray Spot, Gray Streak, Gray Spot and Gray Streak, Particles, Multi-Layer Structure, Line Break, Subsurface Line, Scratch, Hillocks, Grass, Worm-hole, Starburst, Speedboat, Orange Peel, Resist Gel Defect, Controlled Collapse Chip Connection (C4), Microbridge, Submicron, Micron, Micron Sphere, U. Pattern, Contamination, Protrusion, Break, Intrusion, Nuisance, Mask-Related (Shorts), Haze, Microcontamination, Crystalline (Stacking Fault), Spots, Break, Recticle, Hard-Defects (Pinholes, Pindots, Extrusions), Semi-Transparent (Resist Residues, Thin Chrome), Registration (Oversized, Undersized, Mislocated), Corner, Extra Metal, Metal Missing and Opens (Pattern Missing).

Prior art defect detection in a wafer pattern involved acquisition of a wafer image and two reference images at corresponding surface component locations to the left and right of or above and below the image. A detection system aligned the images by searching for a maximum correlation coefficient between images. A detection system then compared the image with each of the two reference images, using pixel by pixel subtraction, to arrive at two difference images. Theoretically, a true defect should exist at the same location of both difference images. If the value of both difference images is large enough when compared to a threshold, the system considers a true defect to exist at that location.

However, many potential false defects may be generated using this method. For example, background color variations caused by chemical mechanical polishing (CMP) have no effect on yield, yet may trigger a difference threshold when using the difference approach. In addition, this method is sensitive to noise caused by factors such as metal grain structure and imperfect alignment. Furthermore, the traditional detection method does not perform defect classification. Therefore, classification results cannot be used as feedback to refine the detection outcomes and therefore do not effectively discriminate between critical defects and nuisance defects.

SUMMARY OF THE INVENTION

The invention provides an image primitive based maskless defect detection method. Using wafer inspection as an example, the invention characterizes wafer patterns and detects potential defects as exceptions to the rules of general wafer pattern structure. The invention further encodes the wafer structure into multiple profiles of a set of primitive characterization modules. The invention correlates the primitive profiles and potential defects along with aligned pattern images for die to die comparison and further refines the results using data from multiple dies. Multiple stage defect classification is applied to the potential defects to reject false or nuisance defects. The method can be generalized to allow correlation between multiple layers of a wafer and can perform automatic or semi-automatic learning to enhance and refine detection rules during a ramp-up stage.

By using a primitive based maskless method, the invention provides for dramatic reduction of false and nuisance defects and maintains a high sensitivity to critical defects. The primitive based maskless method employed by the invention is highly robust and is not sensitive to factors such as metal grain structure and imperfect alignment. The invention further provides for automatic learning to tailor the inspection system for a specific wafer design and manufacturing process.

The invention provides a highly robust method and apparatus to detect and classify defects for in-line or off-line semiconductor wafer or LCD panel inspection that does not require the use of predefined pattern masks.

In one embodiment the invention provides a method for inspecting a semiconductor surface, wherein the semiconductor surface wafer has a first surface component and a second surface component, the method comprising the steps of: obtaining an image of the first surface component and the second surface component; performing a first multimodule maskless primitive characterization for defect detection for the first surface component; performing a second multimodule maskless primitive characterization for defect detection for the second surface component; and performing a correlation between the first multimodule maskless primitive characterization and the second multimodule maskless primitive characterization.

The invention further provides the step of performing multiple surface component correlation, the step of defect clustering, the step of pattern artifact rejection, the step of performing an automatic learning stage, and the step of performing a critical defect detection.

The invention also provides a method for semiconductor surface inspection comprising the steps of: sequentially scanning a semiconductor surface to obtain an image; performing a morphological characterization of the plurality of sequential images to provide a potential defect objects output; performing a sequential labeling characterization of the plurality of sequential images to provide a primitive profiles output; providing a connectivity analysis of the plurality of sequential images to provide a connected component distributions and potential defects output; and integrating the potential defect objects output, the primitive profiles output and the connected component distributions and potential defects output to provide a combined potential defect objects output and a combined primitive profiles output.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 1 shows a shows the maskless inspection system of the invention.

FIG. 2A shows a processing flow diagram of the maskless inspection system.

DETAILED DESCRIPTION OF THE PREFERRED EMBODIMENT

Figure 2B:
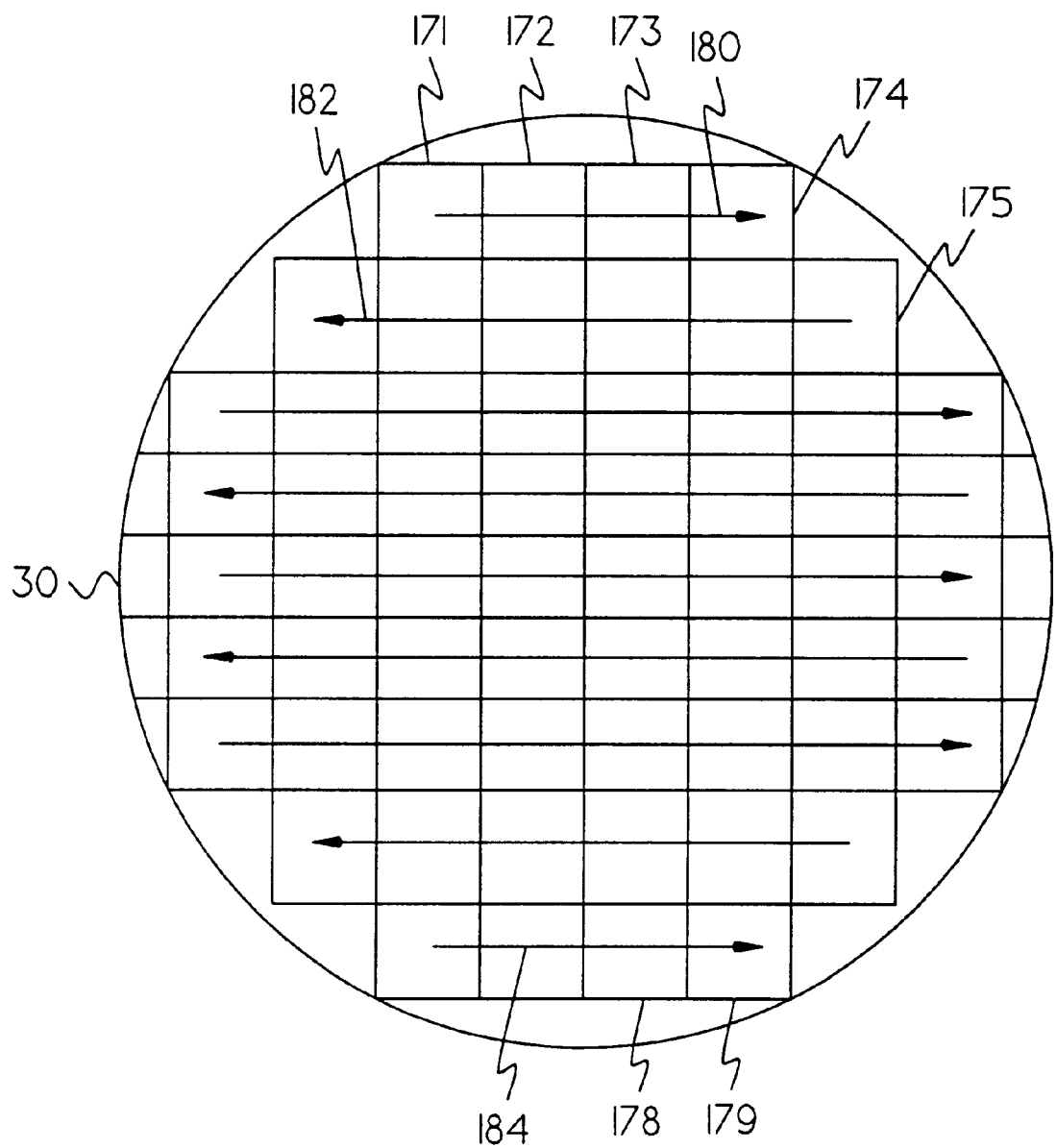
FIG. 2B shows an example of a wafer inspection scanning path.

Refer now to FIG. 1 which shows the maskless inspection system of the invention. The maskless inspection system includes a sensing device 10 having an illumination source and imaging optics 20. The illumination source and imaging optics 20 may further comprise a visible light source, an ultra-violet light source, an infrared light source or an electron beam source. The illumination source and imaging optics 20 illuminates a semiconductor surface 30 to be inspected. In one embodiment of the invention, the surface 30 may comprise the surface of a semiconductor wafer. In an alternate embodiment of the invention, the surface 30 may comprise a liquid crystal display (LCD) surface. The semiconductor wafer or liquid crystal display having surface 30 is positioned on an automated stage 40 for illumination. A storage and loading module 50 loads the semiconductor wafer or liquid crystal display having the surface 30 onto the automated stage 40 for inspection. After inspection, the semiconductor wafer or liquid crystal display is unloaded by a storage and unloading module 60. The automated stage 40 further positions the semiconductor wafer or liquid crystal display panel to align the surface 30 for inspection by the system. As further described with respect to FIG. 2B, the automated stage moves the semiconductor wafer or liquid crystal display through a scanning path so that the entire surface 30 may be scanned.

The maskless inspection system is controlled by a processing unit 70. The processing unit 70 communicates with the sensing device 10 through a bus 80. The processing unit 70 further includes a host computer 78, controllers 72, a high speed image processing unit 74, and a power supply 76. The processing unit 70 controls the scanning of the surface 30 and provides for image processing through the high speed image processing unit 74. The processing unit 70 also provides for defect detection and classification through the host computer 78.

Figure 5:
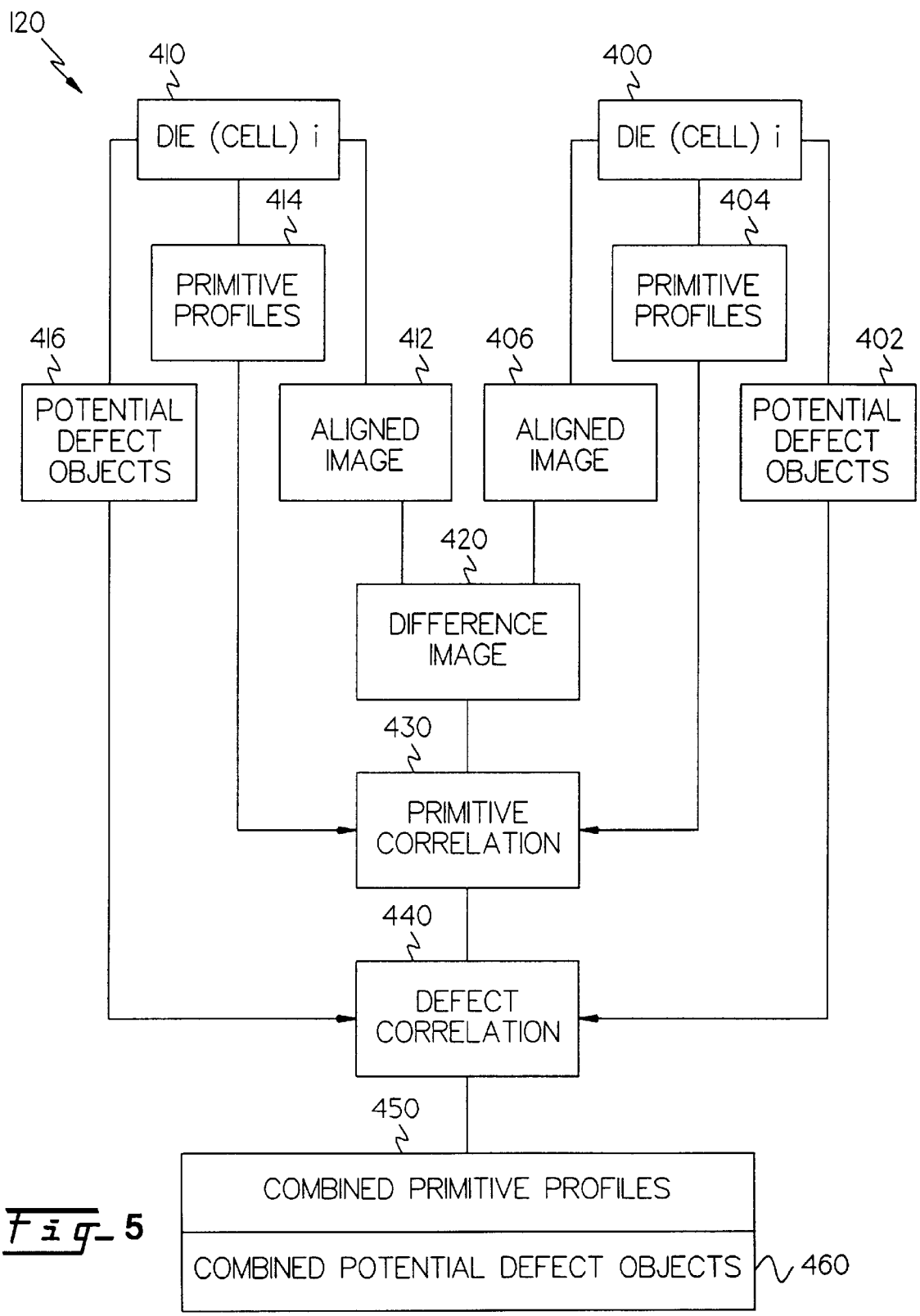
FIG. 5 shows a method of the invention to generate combined primitive profiles and combined potential defect objects.

FIG. 2A shows a processing flow of the maskless inspection system. The maskless inspection system begins with an automatic learning stage 100, described in greater detail with respect to FIG. 9. The inspection process has a scanning path 102. In one embodiment, the inspection system scans a wafer. The scanning path 102 moves sequentially forward from a surface component through adjacent surface components to reach surface component N. In one embodiment, the surface component comprises a die. In an alternate embodiment, the surface component may comprise an lcd. One example scanning path 102 of the inspection system is shown with respect to FIG. 2B. The inspection system takes images of each die. Each of the images of a die is processed using a plurality of mask-free primitive characterization and detection modules 110, 112, 114, 116, 118 to generate primitive profiles and initial defects. The primitive profiles and initial defect detection results are correlated with each other as described in greater detail with respect to FIG. 5. In one example embodiment, the detection results are correlated with corresponding images of neighboring dies. For example, the results from module 110 of Die i may be correlated with the results of module 110 of die i+1 in stage 120. Multiple results from neighboring dies may be correlated to produce multiple correlations in stage 120. The correlations are integrated in multiple dies correlation and critical defect detection stage 130.

The inspection system also maintains a reference profile update database 150. Input from the reference profile update database may be used for the integration of data in stage 130. Likewise, stage 130 may also provide for continuous updating of reference profiles update database 150.

The results from the integration in step 130 may be output in stage 140 as defect clustering and pattern artifact rejection. These may be provided to an operator in stage 160 as wafer inspection results.

Refer now to FIG. 2B which shows an example of a wafer inspection scanning path. The system may begin with a die 171 and proceed sequentially forward with dies 172, 173 and 174 along path 180. The scanning path may then continue with die 175 and scan sequentially forward along path 182. The method finishes by scanning through the intervening scanning paths and concluding with path 184 and dies 178 and 179. As would be appreciated by one skilled in the art, multiple paths may be required for a single die and other scanning paths may be chosen to provide an entire scan of the surface 30.

Figure 3:
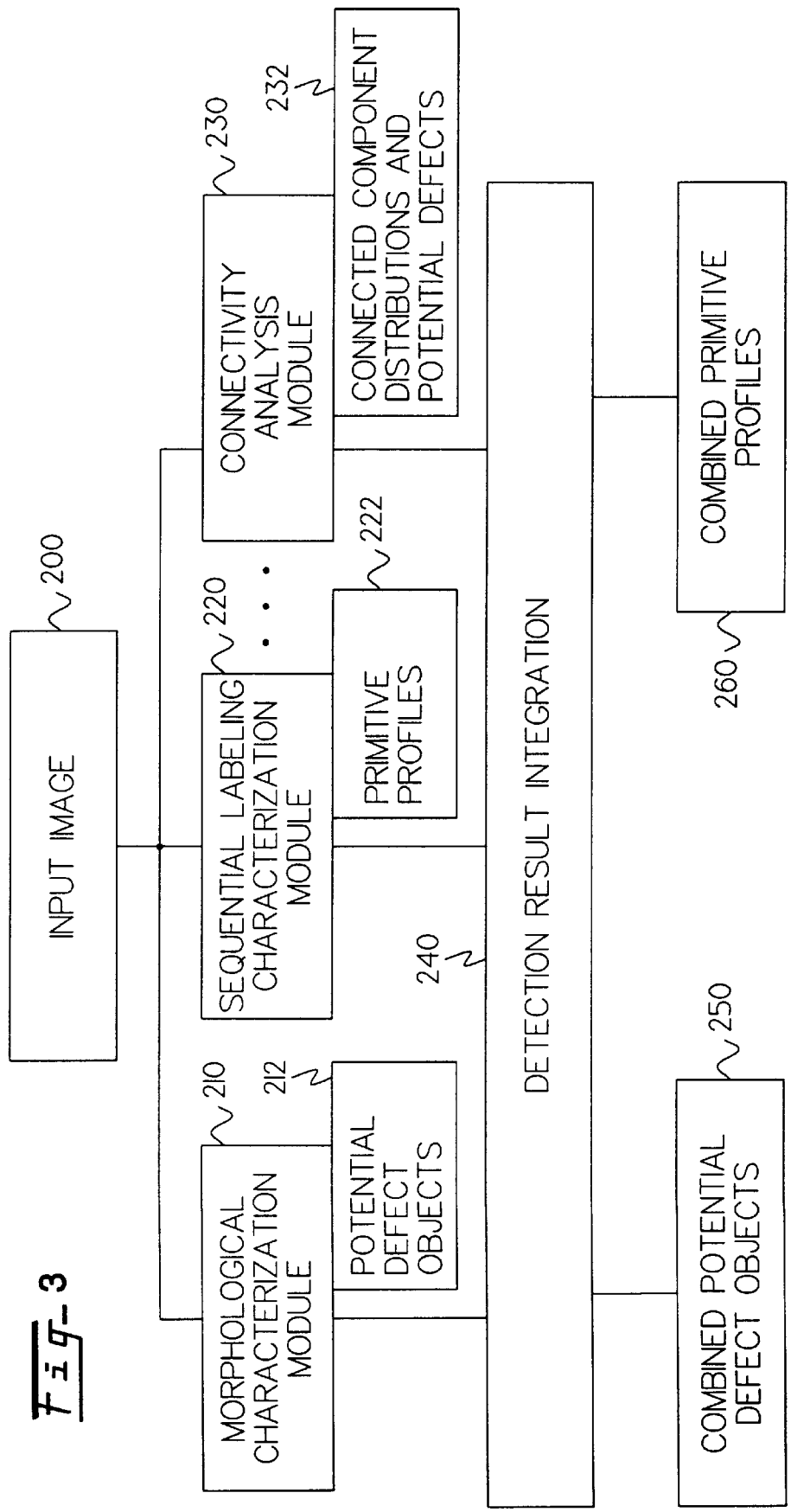
FIG. 3 shows a processing flow diagram of the maskless primitive characterization and defect detection stage.

Refer now to FIG. 3 which shows a flow diagram of the maskless primitive characterization and defect detection stage. The stage begins by inputting an image in step 200. The image may be provided by the sensing device 10. The input image is provided concurrently to a morphological characterization module 210, a sequential labelling characterization module 220 and a connectivity analysis module 230. The morphological characterization module 210 performs morphological operations such as that shown in more detail in FIG. 4A to locate potential defect objects 212. The morphological characterization module 210 provides the potential defect object 212 to the host computer 78 to provide for detection result integration 240. The sequential labelling characterization module 220 determines a medial axis between each pattern component using a sequential labeling operation, as shown in greater detail in FIGS. 4A and 4B. The sequential labeling characterization module 220 performs a distance transformation to label the background pixels with the distance values to their closest components. In one example embodiment, the sequential labelling characterization module 220 may profile the medial axis as distance histogram profiles, as shown in greater detail in FIG. 4A.

The connectivity analysis module 230 detects objects with similar size and shape and notes any objects with a different size and shape. The primitive profiles output 222 and the connected component distributions and potentials defects output 232 are also provided for detection result integration in stage 240. After integration in stage 240, the system provides a combined potential defect objects output 250 and a combined primitive profiles output 260.

Figure 4A:
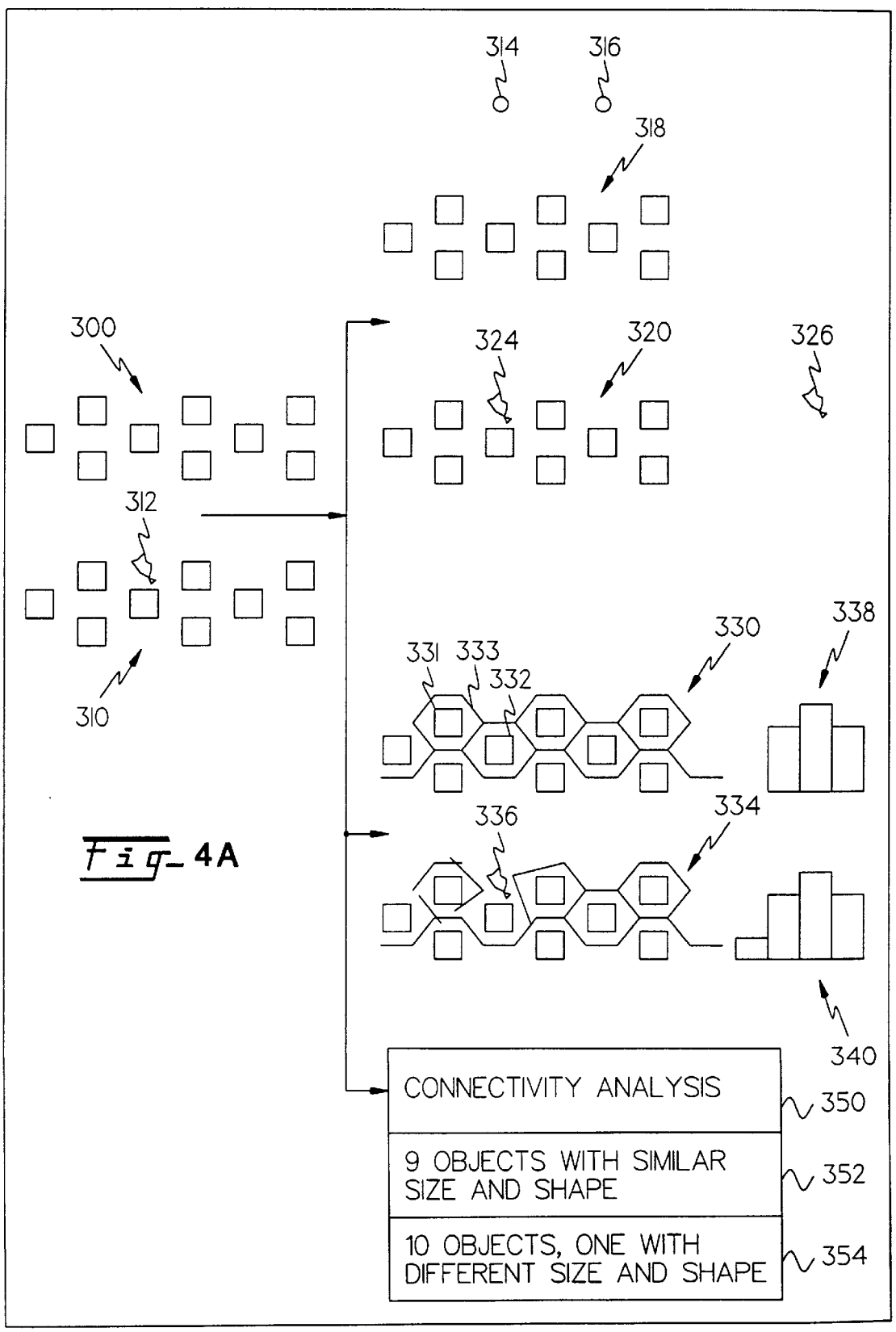
FIG. 4A shows the operations of the maskless primitive characterization modules of the invention.

Refer now to FIG. 4A which illustrates the operations of the maskless primitive characterization modules 110, 112, 114, 116, 118. FIG. 4A illustrates an example of the processing results of these modules. In this example, a normal pattern 300 and the pattern 310 with a contamination defect 312 are input into a characterization module. The characterization module performs an analysis of the input pattern 300 and the input pattern 310 with contamination defect 312. The morphological characterization module 210 applies a two point structuring element to the input patterns by a morphological opening operation.

$$I_{Open} = I_{Pattern} O S_{2\_point}$$

where O is a morphological opening operation, S2_point is a two point structuring element 314, 316, and I_Pattern is the input pattern. The opening results retains the defect free pattern 318 because of the regular pattern structure and does not retain the defect because of the lack of a matched defect at the distance corresponding to the length of the two point structuring element. Therefore, the defect 324 can be detected by taking the difference between the original pattern and the opening result as follows:

$$I_{output} = I_{Pattern} - I_{Open}.$$

The opening results detect potential defect 326 as the difference.

The sequential labeling characterization module 220 determines a medial axis 333 between each pattern component 331, 332 by a sequential labeling operation. The sequential labeling characterization module 220 performs a distance transformation to label the background pixels with the distance values to their closest components. The method plots distance histogram profiles 338, 340 of the medial axes. The normal pattern 300 results in regular medial axis encoding 333 between pattern components 331, 332. The module 220 plots these values as a histogram 338. The pattern 310 having defect 312 results in a distorted medial encoding due to the defect 336. This results in a defect histogram 340.

Figure 4B:
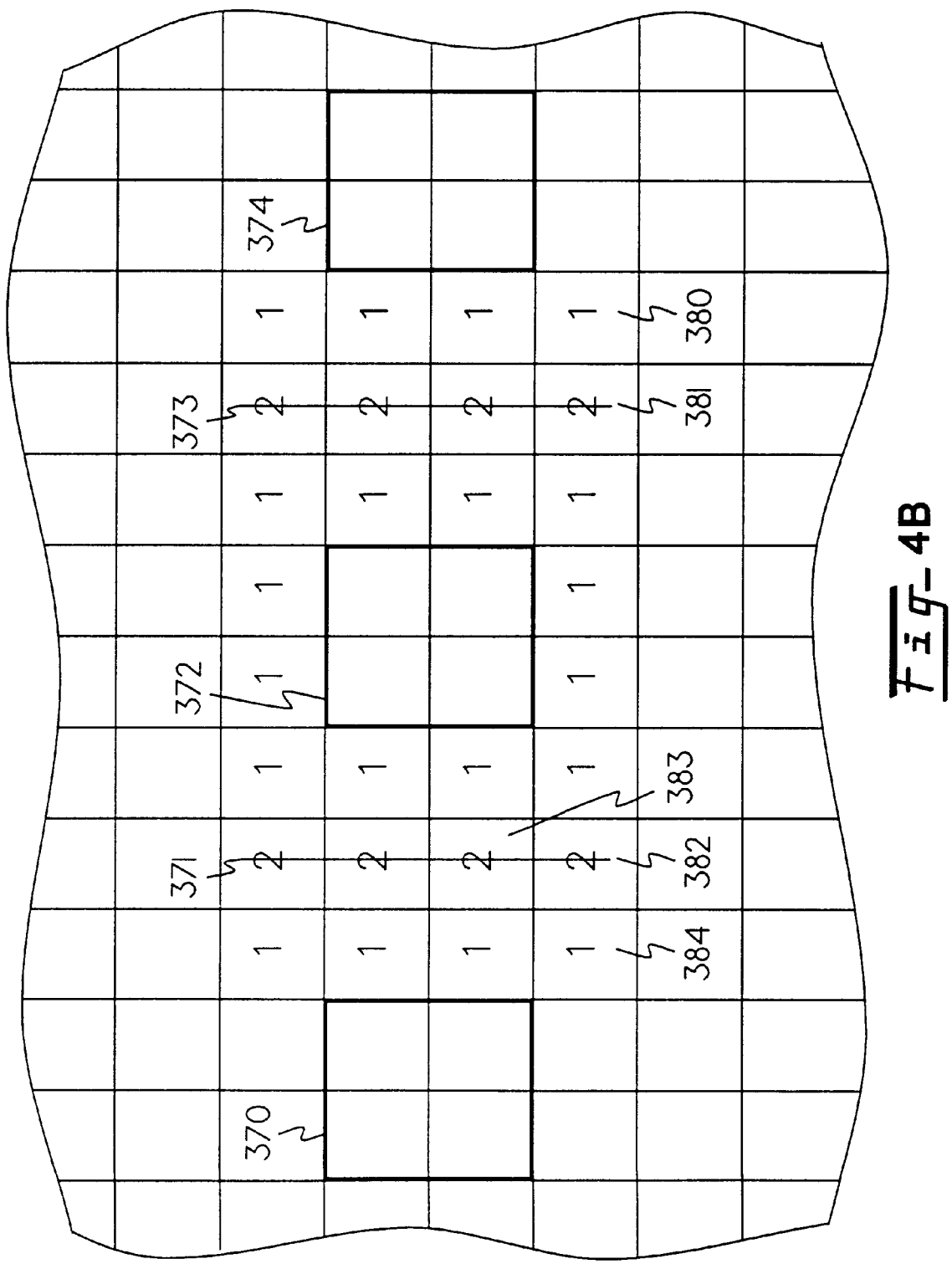
FIG. 4B shows an example of a connected distance transformation.

FIG. 4B shows an example of an eight connected distance transformation to label the background pixels 380, 381, 382, 383, 384 with distance value to closest components 370, 372, 374. Component 372 is the focus of this example. Background pixels in eight directions are labeled sequentially in relation to how far from a closest component they are. Thus a one is found in the border background pixels 380, 384 and a two is found in the next level of background pixels 381, 382, 383. The highest pixels away from the components form the medial axes 371 and 373. Medial axis 371 is formed between component 370 and component 372. Medial axis 373 is formed between component 372 and 374. Other types of labeling are possible such as the four connected type or the modified Euclidian type that is also rotation independent.

Refer again to FIG. 4A, where the connectivity analysis module 230 performs a connectivity analysis 350 to detect an object's size and shape. From the normal pattern 300, the connectivity analysis module 230 detects nine objects with similar size and shape 352. From the pattern 310 having a defect 312 the connectivity analysis module 230 detects ten objects with one having different size and shape 354.

The maskless primitive characterization method provides a highly robust analysis. For example, the morphological characterization module 210 is not sensitive to any horizontal or vertical translation of the patterns. The sequential labeling characterization module 220 and the connectivity analysis module 230 are not sensitive to any translation or rotation of the patterns and are therefore highly robust. The detection result integration module 240 integrates the results from multiple characterization modules and assigns confidence to the initial detection result. The confidence value generations can be determined by the statistics created by the automatic learning stage 100. For example, the potential defect 326 detected by the morphological characterization module 210 will be assigned a high confidence value since the connectivity analysis module 230 has detected an object which is different from the other objects.

In one embodiment, the initial defect detection from the maskless primitive characterization and defect detection stage is designed to be highly sensitive and may contain many false defects. The die to die (cell to cell) correlation stage uses the correlation between the same area of two corresponding dies (cells) to condition the primitive characterization profiles and the initial detection results to improve the specificity of the defect detection results. call me Refer now to FIG. 5 which shows a method of the invention to align the images 400, 410 of the two corresponding die (cell) areas 406, 412 and to create a difference image 420. The method then correlates the primitive profiles 404, 414 of the two images 400, 410 and highlights the difference 430. Referring to the example of FIG. 4A, the difference between the distance histogram profiles 338, 340 generated from the sequential labeling module 220 and the extra object generated from the connectivity analysis 354 are identified and used to support the existence of a defect.

A difference measurement between distance histogram profiles can be computed by:

$$d(1,2) = \sum_{i=K}^{L} (f_1(i) - f_2(i))^2 / (f_1(i) + f_2(i))$$

Where $f_1(i)$ is the frequency count of the distance label i from image 1 and $f_2(i)$ is the frequency count of the distance label i from image 2 and K and L are the smallest and largest distance labels from the distance histogram profiles.

A $\chi^2$ probability function P(d|L−K) is used as a confidence function to convert the difference d to a confidence value. P(d|L−K) is defined as the probability that the observed value should be less than d for a $\chi_v^2$ distribution with L−K degrees of freedom. The value of P(d|L−K) is between 0 and 1.

For the connectivity analysis result comparison, a mapping between the objects, connected components, of the two images is first established. An extra object in one image will be mapped to a pseudo object in the other image. The difference measurement between a set of selected feature values such as size, shape, contrast, texture, and color of the matched objects can be used for comparison as follows:

$$d'(1,2) = \left[\sum_{i=1}^{P}\sum_{j=1}^{Q}(f_{1j}(i) - f_{2j}(i))^2\right] / (\sigma^2 f_{1j} + \sigma^2 f_{2j})$$

Where $\sigma^2 f_{1j}$ is the variance of the feature j from the objects in image 1 and $\sigma^2 f_{2j}$ is the variance of the feature j from the objects in image 2. A confidence function to convert the difference value d'(1, 2) to a confidence value between 0 and 1 can be derived from F statistics. Those skilled in the art will recognize that other difference measurements and confidence conversion functions may be used without deviating from the scope of the invention.

In addition, a confidence value can be generated for each pixel location of the difference image from the aligned image subtraction results. The absolute pixel values of the difference image are first smoothed by a low-pass filter to reduce the effect of misalignment and then the pixel values of the smoothed difference image are mapped to a confidence function that is defined by the probability function $Z(p|\mu,\sigma_2)$. The function $Z(p|\mu,\sigma_2)$ is defined as the probability that the observed value of a Gaussian distribution with mean $\mu$ and variance $\sigma_2$ should be less than p, where $\mu$ and $\sigma_2$ are the expected level of pattern, imaging, and image alignment variations between the images of the corresponding areas of two dies. These parameters can be predetermined in the automatic learning stage.

The confidence value for the potential defect after the die to die (cell to cell) correlation processing stage can be determined as c_defect=o_defect * d(1,2) * d'(1,2) * Z(p|μ,σ₂)

where o_defect is the initial confidence value of the defect determined by the maskless primitive characterization and defect detection stage. Other combination rules can also be used, such as c_defect=1−(1−o_defect) * (1−d(1,2)) * (1−d'(1,2)) * (1−Z(p|μ, σ₂))

or c″_defect=(c_defect+c_defect)/2, etc.

A defect in die i could have two confidence values after the die to die correlation stage 440. One from the correlation with die i−1 and the other from the correlation with die i+1. To reduce false defects, the resulting confidence value for a defect in die i is chosen to be the smaller one of these two confidence values. The defect confidence value can be compared to a pre-determined threshold. If the confidence value is above the threshold, then a potential defect is detected. In this case, the connectivity analysis extracted features and primitive profiles for this die will be saved for additional processing in the later stages.

If no potential defect is detected from the images, the primitive profiles of these images can be combined by averaging over their profile values. The reference primitive profiles are maintained and updated dynamically. The initial reference primitive profiles can be selected as the profiles from the first defect free die. The combined primitive profiles 450 will be used to update the reference primitive profiles. If potential defects are detected from at least one image, the primitive profiles will not be combined and will be stored and the reference primitive profiles will not be updated based on these images. The final reference primitive profile after the processing of the whole wafer is the average profile of all images of defect free dies.

Figure 6:
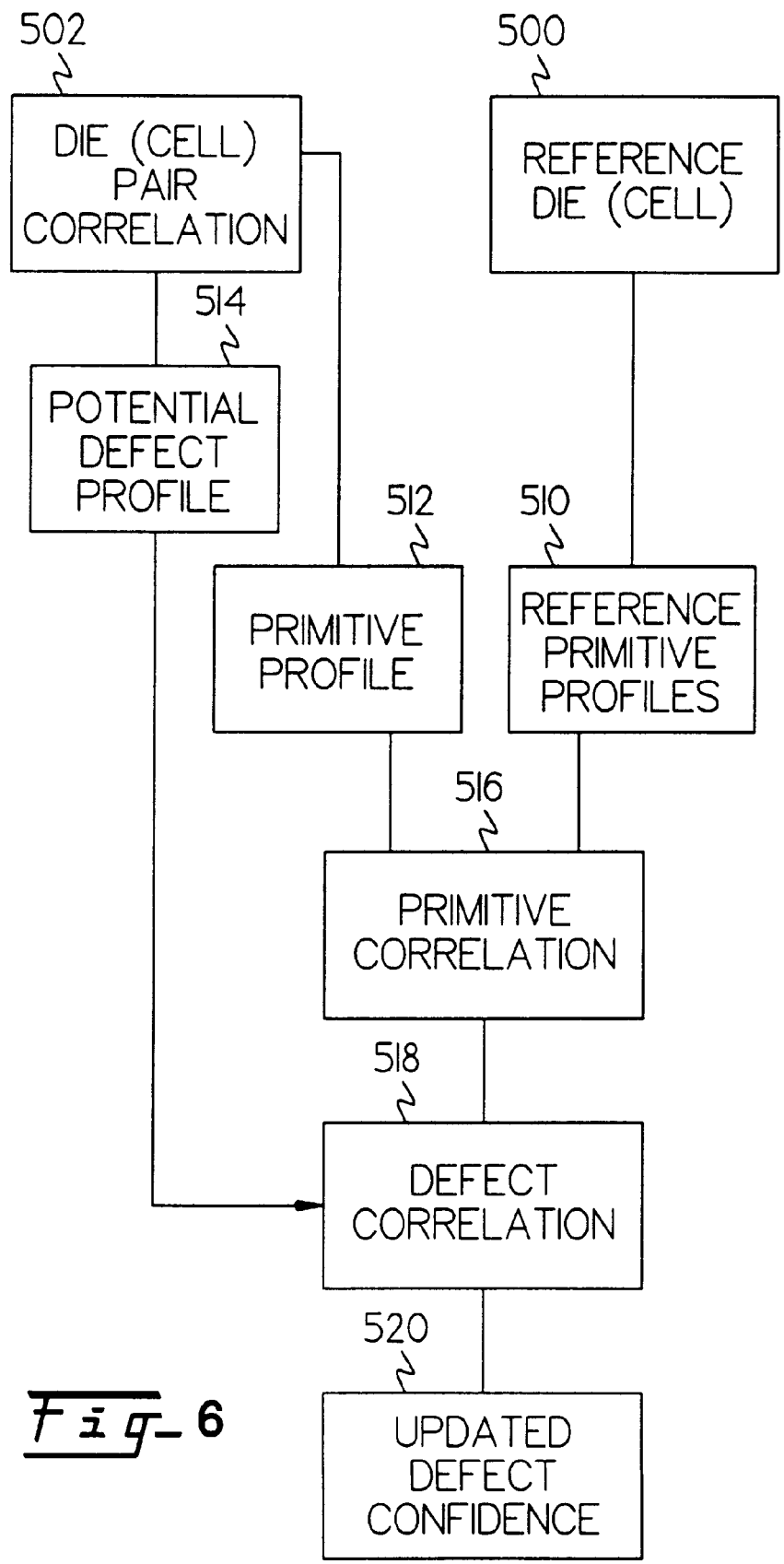
FIG. 6 shows the method of the invention to perform defect correlation and to update the defect confidences.

Refer now to FIG. 6 which shows the method of the invention to perform defect correlation and to update the defect confidence. In addition to die to die correlation, the information from multiple dies (cells) 500, 502 can also be correlated 440 to enhance the defect detection results and reject nuisance defects. In this stage, the primitive profiles 512 of the die having potential defects are compared to the reference profiles 510 to provide a primitive correlation 516. Similarly, comparison methods and confidence functions as used in the die to die (cell to cell) correlation stage 518 can be used to update the confidence values of the potential defects to provide updated defect confidence 520. The potential defects having high enough confidence after the update using the reference primitive profiles will be classified using their features.

Figure 7:
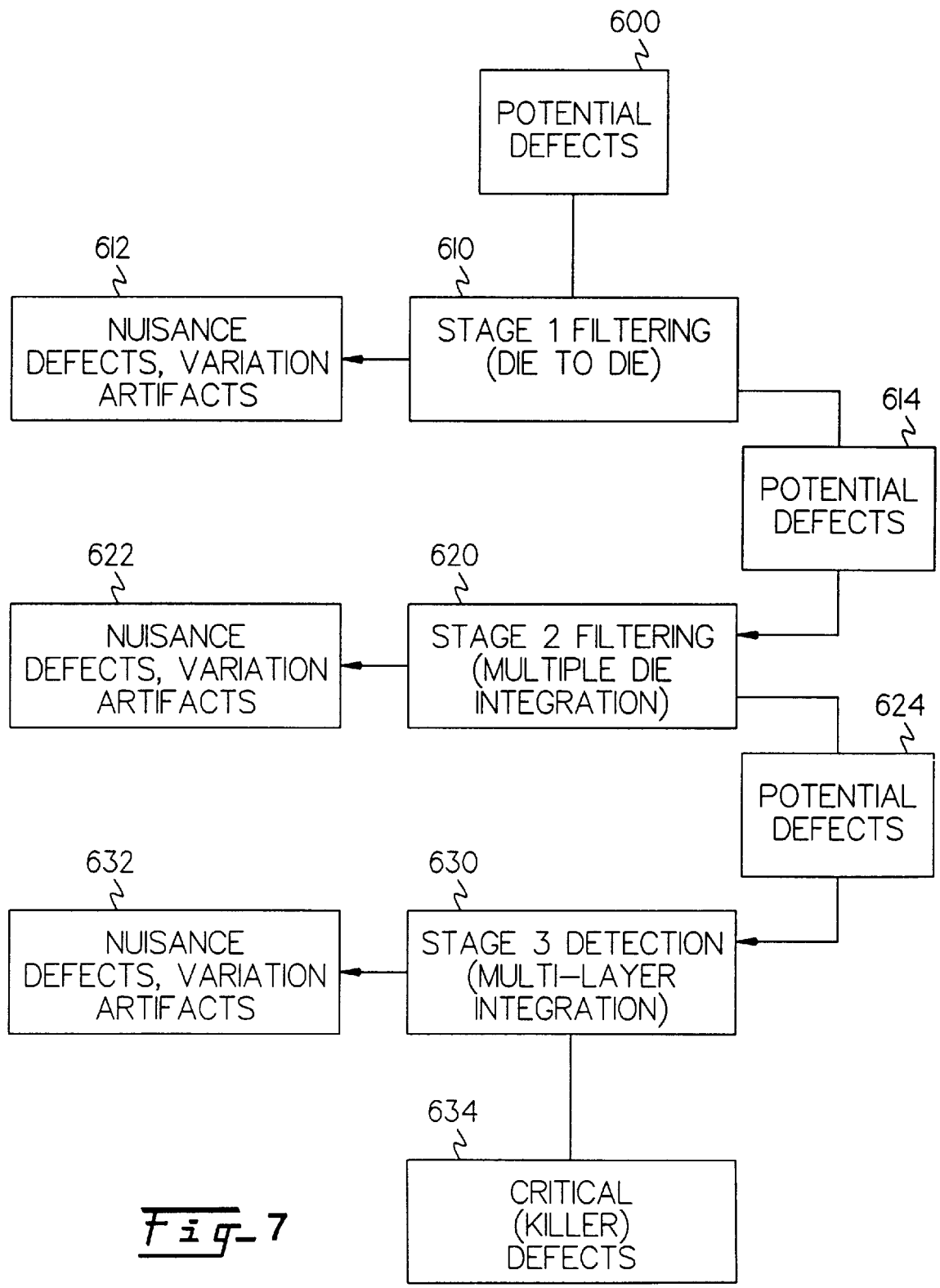
FIG. 7 shows one embodiment of a multiple stage classification method of the invention.

Refer now to FIG. 7 which shows one embodiment of a multiple stage classification method of the invention. The Stage 1 classifier 610 receives a potential defects input 600 and uses the connectivity analysis features extracted from the defect image and the primitive profiles as well as die to die correlation features to classify a defect into either a nuisance defect or variation artifact 612 or potential critical defect types 614 such as mask defects, process defects, or foreign materials, etc. The method further classifies the potential critical defects 614 using multiple die integration features as well as the Stage 1 classification results of other defects in the same wafer to further reject nuisance defects and variation artifacts 622. The classification process can be extended to include the information from multiple layers of the wafer if they are available in stage 630. The multiple stage process allows the rejection of nuisance defects and variation artifacts 632 so that only potential critical defects 634 are detected and used to improve the yield of the wafer fabrication process.

Figure 8:
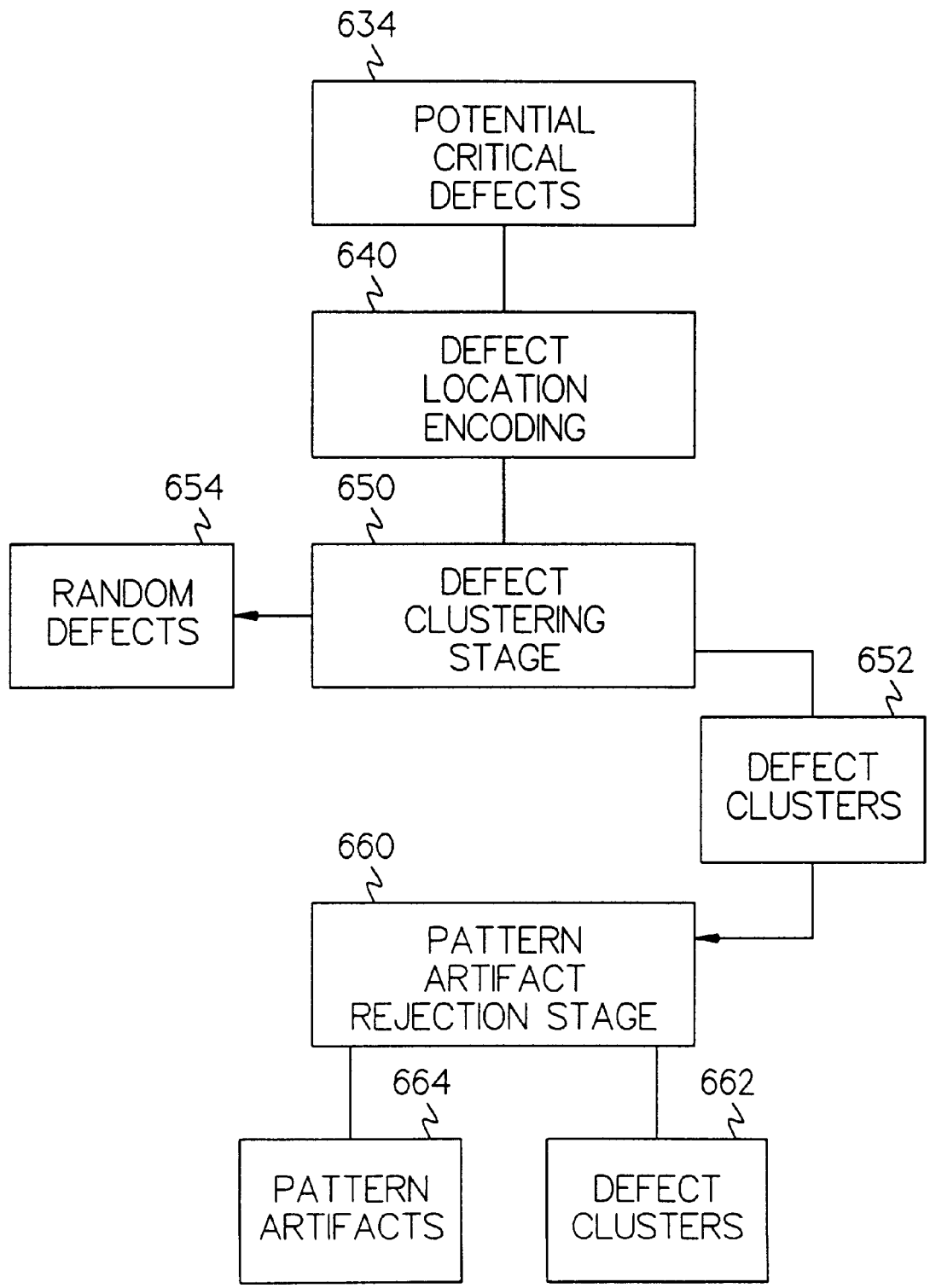
FIG. 8 shows a processing flow diagram of the defect clustering and pattern artifact rejection method of the invention.

Refer now to FIG. 8 which shows a flow diagram of the defect clustering and pattern artifact rejection method of the invention. The method receives the potential critical defects input 634 from the critical defects output of the multiple stage classification method. The method encodes the location of the critical defects in stage 640. After the processing by the defect clustering stage 650, the method groups certain critical defects into defect clusters 652 and considers the remaining defects 654 as random defects. Unsupervised clustering methods can be used to determine the number of clusters and assign data to each cluster. The most popular unsupervised clustering method is the isodata algorithm (fuzzy isodata algorithm) and the k means clustering algorithm (fuzzy c means clustering). This method is based on the distance metric in feature space.

As shown in FIG. 8, to perform defect clustering, a location encoding stage 640 determines the absolute locations of the defects in a wafer and further determines relative locations of the defects within their dies (cells) to extract the location features. The location features along with other defect features such as size, shape, contrast, texture, color, are used for the unsupervised clustering process in defect clustering stage 650. The defect clustering stage generates groups of defect clusters 652 and considers the remaining ones to be random defects 654. A pattern artifact rejection stage 660 considers defects that locate systematically at similar relative location of many dies may be pattern artifacts 664 rather than real defects 662. A pattern artifact rejection stage 660 is incorporated to reject pattern artifacts 664 that form as clusters. The determination of defect clusters 652 versus random defects 654 facilitates the development of an efficient sampling plan for further high resolution defect classification processes to determine the cause of defects and to improve the yield of the fabrication process. Pattern classification methods such as binary decision trees, artificial neural networks, parametric and non-parametric statistical classifiers can be used for defect filtering.

Figure 9:
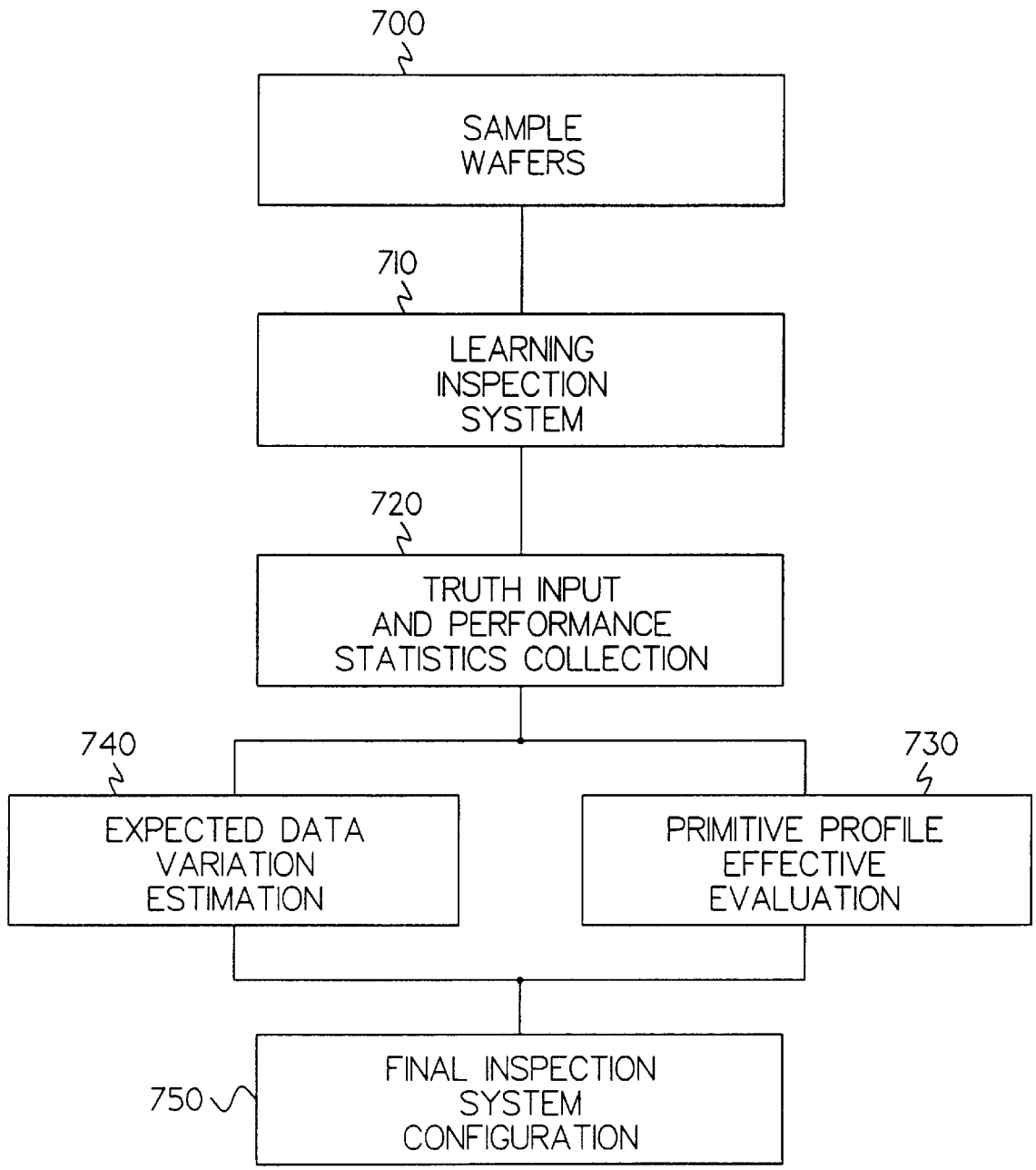
FIG. 9 shows a processing flow diagram of an automatic learning stage to generate a final inspection system configuration.
Figure 10:
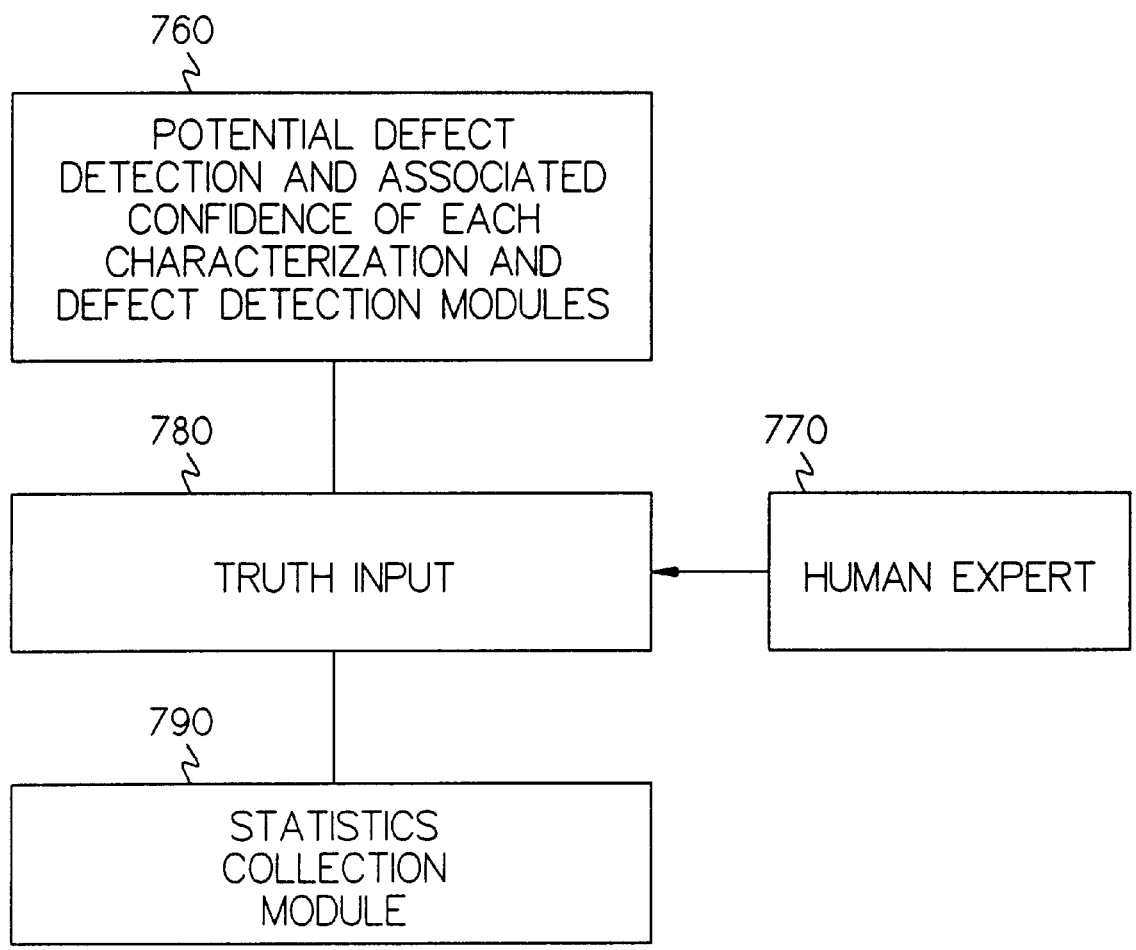
FIG. 10 shows a processing flow diagram of the operation of the truth input and performance statistics collection module of the invention.

Refer now to FIG. 9 which shows a processing flow of an automatic learning stage incorporated into the invention. Sample wafers 700 with known characteristics are input into a learning inspection system 710. The learning inspection system 710 includes all components of an inspection system as shown in greater detail in FIGS. 1 and 2A. A complete set of the primitive characterization and defect detection modules are incorporated into the inspection system to collect data. A truth input and performance statistics collection module 720 saves the contribution of each primitive characterization and defect detection module to a defect classification results file and displays the detected defects to users for truth labeling. FIG. 10 shows the operation of the truth input and performance statistics collection module 720 in greater detail.

In the automatic learning stage, the learning inspection system 710 applies the set of sample wafers 700 during the ramp-up or pilot production phase of the wafer manufacturing cycle. After sufficient learning wafer characterization and defect data are collected, the learning stage evaluates the effectiveness of different primitive profiles to the detection of defects in stage 730. Only the primitive characterization modules that correspond to effective primitive profiles are retained for the final version of the inspection system.

Additionally, the method determines an expected level of pattern, imaging, and image alignment variations 740 between the aligned images of two dies and uses the variation estimation 740 to set the parameters for the die to die (cell to cell) correlation stage. A priori reference primitive profiles can also be generated using the learning data which can be used as initial reference primitive profiles for the final inspection system configuration 750.

Refer now to FIG. 10, which shows the truth input and performance statistics collection module 720 in greater detail. The potential defect detection and the associated confidence of the detected potential defects from each characterization and defect detection module 760 are input into the truth input and performance statistics collection module. These inputs include those on the following list as follows:

Potential_defect1 confidence_11 Confidence_12 confidence_13 Confidence_14 . . . Confidence_1N
Potential_defect2 confidence_21 Confidence_22 confidence_23 Confidence_24 . . . Confidence_2N
Potential_defectL confidence_L1 Confidence_L2 confidence_L3 Confidence_L4 . . . Confidence_LN where potential_defecti is the confidence value for the ith potential defect and Confidence_ij is the confidence value of the jth module to the ith defect. In one preferred embodiment, calculation of the confidence values are performed as shown with reference to FIG. 5. The confidence values range from 0 to 1 designating the likelihood of being a true defect. The truth input module 780 shows the defect location or images to a human expert 770 for a defect truth label. In a preferred embodiment of implementation, the truth labels are "defect" versus "non-defect". Based on the truth labels, the statistics collection module 790 divides the potential defects into two groups, a correctly classified group (truth label of "defect") and an incorrectly classified group (truth label of "non-defect"). The contribution of each module to overall defect confidence for a potential defect can be determined in one embodiment of the invention as:

$$contribution\_ij = correctness\_index * confidence\_ij/potential\_defect\_i$$

where the correctness_index is 1.0 for the defect in the correctly classified group and is −1.0 for the defect in the incorrectly classified group.

The primitive profile effective evaluation module evaluates the overall performance of each primitive profile to defect detection and rejection. In one embodiment of the invention, the performance measure for module j is defined as:

$$Performance\_j = \sum_{i=1}^{L} contribution\_ij$$

In one embodiment of the invention, two parameters are predetermined. The first parameter K sets the minimum number of modules to be used in the inspection system and the second parameter t determines the minimal acceptable performance measure. The top K primitive modules will be selected first and the remaining modules having performance measure greater than t will also be selected for the final inspection system configuration.

For the selected primitive modules, their data from the incorrectly classified group will be used by the expected data variation estimation module to estimate the expected data variation not caused by the true defects. The expected data variation value for module j can be determined by averaging over the confidence value for module j for all non-defect objects in the incorrectly classified group.

The following patents and patent applications are incorporated by reference hereto:

U.S. Pat. No. 5,787,188, issued Jul. 28, 1998, which is a file wrapper continuation of abandoned U.S. Pat. application Ser. No. 07/838,064, entitled "Method For Identifying Normal Biomedical Specimens", by Alan C. Nelson et al., filed Feb. 18, 1992.

U.S. Pat. No. 5,528,703, issued Jun. 18, 1996, entitled "Method For Identifying Objects Using Data Processing Techniques", by S. J. Lee et al., filed Feb. 18, 1992.

U.S. Pat. No. 5,315,700, issued May 24, 1994, entitled "Method And Apparatus For Rapidly Processing Data Sequences", by Richard S. Johnston et al.

U.S. Pat. No. 5,361,140, issued Nov. 1, 1994, entitled "Method and Apparatus for Dynamic Correction of Microscopic Image Signals" by Jon W. Hayenga et al.

U.S. Pat. No. 5,912,699, issued Jun. 15, 1999, entitled "Method and Apparatus for Rapid Capture of Focused Microscopic Images" to Hayenga, et al., which is a continuation-in-part of abandoned U.S. patent application Ser. No. 07/838,063 filed on Feb. 18, 1992.

U.S. Pat. No. 5,757,954, issued May 26, 1998, to Kuan et al. entitled, "Field Prioritization Apparatus and Method."

Pending U.S. patent application Ser. No. 08/309,061, filed Sep. 20, 1994, to Wilhelm et al., entitled "Apparatus for Automated Identification of Cell Groupings on a Biological Specimen."

Pending U.S. patent application Ser. No. 08/309,116, filed Sep. 20, 1994, to Meyer et al. entitled "Apparatus for Automated Identification of Thick Cell Groupings on a Biological Specimen."

U.S. Pat. No. 5,787,189, issued Jul. 28, 1998, which is a file wrapper continuation of abandoned U.S. patent application Ser. No. 08/309,115 to Lee et al. entitled "Biological Analysis System Self Calibration Apparatus."

U.S. Pat. No. 5,828,776, issued Oct. 27, 1998, which is a file wrapper continuation of abandoned U.S. patent application Ser. No. 08/308,992, to Lee et al. entitled "Apparatus for Identification and Integration of Multiple Cell Patterns."

U.S. Pat. No. 5,627,908, issued May 6, 1997, entitled "A Method for Cytological System Dynamic Normalization" by Lee et al.

U.S. Pat. No. 5,638,459, issued Jun. 10, 1997, entitled "Method and Apparatus for Detecting a Microscope Slide Coverslip" to Rosenlof et al.

U.S. Pat. No. 5,566,249, issued Oct. 15, 1996, to Rosenlof et al. entitled "Apparatus for Detecting Bubbles in Coverslip Adhesive."

Allowed U.S. patent application Ser. No. 08/309,931, filed Sep. 20, 1994, to Lee et al. entitled "Cytological Slide Scoring Apparatus."

U.S. Pat. No. 5,978,497, issued Nov. 2, 1999, to Lee et al. entitled "Apparatus for the Identification of Free-Lying Cells."

U.S. Pat. No. 5,740,269, issued Apr. 14, 1998, to Oh et al. entitled "A Method and Apparatus for Robust Biological Specimen Classification."

U.S. Pat. No. 5,715,327 issued Feb. 3, 1998, to Wilhelm et al. entitled "Method and Apparatus for Detection of Unsuitable Conditions for Automated Cytology Scoring."

U.S. Pat. No. 5,797,130, issued Aug. 18, 1998, to Nelson et al., which is a file wrapper continuation of abandoned U.S. patent application Ser. No. 08/153,293 entitled "Method for Testing Proficiency in Screening Images of Biological Slides", filed Nov. 16, 1993.

U.S. Pat. No. 5,699,794, issued Dec. 23, 1997, to Fleck, entitled "Apparatus for Automated Urine Sediment Sample Handling."

Pending U.S. patent application Ser. No. 08/485,182 to Lee et al., filed Jun. 7, 1995, entitled "Interactive Method and Apparatus for Sorting Biological Specimens."

U.S. Pat. No. 5,647,025, issued Jul. 8, 1997 to Frost et al., entitled "Automatic Focusing of Biomedical Specimens Apparatus".

U.S. Pat. No. 5,677,762, issued Oct. 14, 1997, to Ortyn et al., which is a file wrapper continuation of abandoned U.S. patent application Ser. No. 08/309,064 entitled "Apparatus for Illumination Stabilization and Homogenization."

U.S. Pat. No. 5,875,258, issued Feb. 23, 1999, to Ortyn et al., which is a file wrapper continuation of abandoned U.S. patent application Ser. No. 08/309,249 entitled "Biological Specimen Analysis System Processing Integrity Checking Apparatus."

U.S. Pat. No. 5,715,326, issued Feb. 3, 1998 to Ortyn entitled "Cytological System Illumination Integrity Checking Apparatus and Method."

U.S. Pat. No. 5,581,631, issued Dec. 3, 1996 to Ortyn et al., entitled "Cytological System Image Collection Integrity Checking Apparatus."

U.S. Pat. No. 5,557,097, issued Sep. 17, 1996, to Ortyn et al., entitled "Cytological System Autofocus Integrity Checking Apparatus."

U.S. Pat. No. 5,499,097, issued Mar. 12, 1996 to Ortyn et al., entitled "Method and Apparatus for Checking Automated Optical System Performance Repeatability."

U.S. Pat. No. 5,692,066, issued Nov. 25, 1997, to Lee et al., entitled "Method and Apparatus for Image Plane Modulation Pattern Recognition."

U.S. Pat. No. 5,799,101, issued Aug. 25, 1998, which is a file wrapper continuation of abandoned U.S. patent application Ser. No. 08/315,719, filed Sep. 30, 1994, by Lee et al., entitled "Method and Apparatus for Highly Efficient Computer Aided Screening."

U.S. Pat. No. 5,787,208, issued Jul. 28, 1998, to Oh et al., entitled "Image Enhancement Method and Apparatus."

U.S. Pat. No. 5,642,441, issued Jun. 24, 1997, to Riley et al., entitled "Apparatus and Method for Measuring Focal Plane Separation."

U.S. Pat. No. 5,625,706, issued Apr. 29, 1997 to Lee et al., entitled "Method and Apparatus for Continuously Monitoring and Forecasting Slide and Specimen Preparation for a Biological Specimen Population."

U.S. Pat. No. 5,745,601, issued Apr. 28, 1998, to Lee et al., entitled "Robustness of Classification Measurement Apparatus and Method."

U.S. Pat. No. 5,671,288, issued Sep. 23, 1997 to Wilhelm et al., entitled "Method and Apparatus for Assessing Slide and Specimen Preparation Quality."

U.S. Pat. No. 5,621,519, issued Apr. 15, 1997 to Frost et al., entitled "Imaging System Transfer Function Control Method and Apparatus."

U.S. Pat. No. 5,619,428, issued Apr. 8, 1997 to Lee et al., entitled "Method and Apparatus for Integrating An Automated System to a Laboratory."

U.S. Pat. No. 5,781,667, issued Jul. 14, 1998, to Schmidt et al., entitled "Apparatus for High Speed Morphological Processing."

U.S. Pat. No. 5,642,433, issued Jun. 24, 1997 to Lee et al., entitled "Method and Apparatus for Image Contrast Quality Evaluation."

U.S. Pat. No. 5,867,610, issued Feb. 2, 1999, which is a divisional of U.S. Pat. No. 5,710,842, issued Jan. 20, 1998, to Lee, which is a divisional of U.S. Pat. No. 5,528,703, entitled "Method for Identifying Objects Using Data Processing Techniques."

U.S. Pat. No. 5,937,103, issued Aug. 10, 1999 to Oh et al., entitled "Method and Apparatus for Alias Free Measurement of Optical Transfer Function."

U.S. Pat. No. 5,654,535, issued Aug. 5, 1997, which is a divisional of U.S. Pat. No. 5,557,097, issued Sep. 17, 1996, to Ortyn et al., entitled "Cytological System Autofocus Integrity Checking Apparatus."

U.S. Pat. No. 5,812,692, issued Sep. 22, 1998 to Rosenlof et al., which is a divisional of U.S. Pat. No. 5,638,459, issued Jun. 10, 1997, entitled "Method and Apparatus for Detecting a Microscope Slide Coverslip."

Pending U.S. patent application Ser. No. 08/767,457 to Lee et al., filed Dec. 16, 1996 entitled "Method and Apparatus for Efficacy Improvement in Management of Cases With Equivocal Screening Results."

U.S. Pat. No. 5,892,218 issued Apr. 6, 1999, to Ortyn et al., which is a divisional of U.S. Pat. No. 5,654,535, issued Aug. 5, 1997, entitled "Cytological System Autofocus Integrity Checking Apparatus."

U.S. Pat. No. 5,760,387, issued Jun. 2, 1998 to Ortyn et al., which is a divisional of U.S. Pat. No. 5,654,535, issued Aug. 5, 1997, entitled "Cytological System Autofocus Integrity Checking Apparatus."

U.S. Pat. No. 5,841,124, issued Nov. 24, 1998 to Ortyn et al., which is a divisional of U.S. Pat. No. 5,654,535, issued Aug. 5, 1997, entitled "Cytological System Autofocus Integrity Checking Apparatus."

U.S. Pat. No. 5,763,871, issued Jun. 9, 1998, to Ortyn et al., which is a divisional of U.S. Pat. No. 5,654,535, issued Aug. 5, 1997, entitled "Cytological System Autofocus Integrity Checking Apparatus."

U.S. Pat. No. 5,877,489, issued Mar. 2, 1999, to Ortyn et al., which is a divisional of U.S. Pat. 5,654,535, issued Aug. 5, 1997, entitled "Cytological System Autofocus Integrity Checking Apparatus."

U.S. Pat. No. 5,883,982, issued Mar. 16, 1999, which is a divisional of U.S. Pat. No. 5,642,441, issued Jun. 24, 1997, to Riley et al., entitled "Apparatus and Method for Measuring Focal Plane Separation."

Pending U.S. patent application Ser. No. 08/888,115, filed Jul. 3, 1997, entitled "Method and Apparatus for Maskless Semiconductor and Liquid Crystal Display Inspection" by Lee et al.

Pending U.S. patent application Ser. No. 08/888,120, filed Jul. 3, 1997, entitled "Method and Apparatus for A Reduced Instruction Set Architecture for Multidimensional Image Processing" by Hayenga et al.

Pending U.S. patent application Ser. No. 08/888,119, filed Jul. 3, 1997, entitled "Method and Apparatus for Incremental Concurrent Learning in Automatic Semiconductor Wafer and Liquid Crystal Display Defect Classification" by Kuan et al.

Pending U.S. patent application Ser. No. 08/888,116, filed Jul. 3, 1997, entitled "Method and Apparatus for Semiconductor Wafer and LCD Inspection Using Multidimensional Image Decomposition and Synthesis" by Nelson et al.

All of the above referenced patent applications and patents are incorporated herein, in their entirety, by the foregoing references thereto.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for inspecting a semiconductor surface, wherein the semiconductor surface has a first surface component and a second surface component, the method comprising the steps of:
    (a) obtaining an image of the first surface component and the second surface component;
    (b) performing a first multimodule maskless primitive characterization for defect detection for the first surface component;
    (c) performing a second multimodule maskless primitive characterization for defect detection for the second surface component;
    (d) performing a correlation between the first multimodule maskless primitive characterization and the second multimodule maskless primitive characterization; and
    (e) wherein the step of performing a correlation between the first multimodule maskless primitive characterization from a first semiconductor surface component and the second multimodule maskless primitive characterization from a second semiconductor surface component further comprises the steps of:
        (i) providing a first set of primitive profiles for the first semiconductor surface component;
        (ii) providing a second set of primitive profiles for the second semiconductor surface component;
        (iii) computing a first set of potential defect objects from the image of the first semiconductor surface component;
        (iv) computing a second set of potential defect objects from the image of the second semiconductor surface component;
        (v) correlating the first set of primitive profiles, the second set of primitive profiles to provide a primitive correlation; and
        (vi) correlating the first set of potential defect objects the second set of potential defect objects and the primitive correlation.

2. The method of claim 1 further comprising the step of performing multiple surface component correlation.

3. The method of claim 2 further comprising the step of defect clustering.

4. The method of claim 3 further comprising the step of pattern artifact rejection.

5. The method of claim 2 wherein the step of performing multiple surface component correlation further comprises the steps of:
    (a) providing the primitive profiles for a semiconductor surface component;
    (b) providing the reference primitive profiles for the semiconductor surface;
    (c) providing a set of potential defect objects with confidence values from the image of the semiconductor surface component;
    (d) correlating the primitive profiles, reference primitive profiles to provide a primitive correlation; and
    (e) correlating the potential defect objects and the primitive correlation to update defect confidences.

6. The method of claim 1 further comprising the step of performing an automatic learning stage.

7. The method of claim 1 further comprising the step of performing a critical defect detection.

8. The method of claim 1 wherein the semiconductor surface is a wafer.

9. The method of claim 1 wherein the semiconductor surface is a liquid crystal display panel.

10. The method of claim 1 wherein the first surface component is a die of a semiconductor wafer.

11. The method of claim 1 wherein the first surface component is an active matrix element of a liquid crystal display panel.

12. The method of claim 1 wherein multiple scans are performed to cover an entire surface of the semiconductor surface.

13. The method of claim 1 further comprising the step of providing a plurality of reference profiles for multimodule maskless primitive characterizations.

14. The method of claim 13 further comprising the step of continuously updating the plurality of reference profiles.

15. The method of claim 1 further comprising the steps of:
    (a) aligning the image of the first surface component with the image of the second semiconductor surface component;
    (b) computing a difference image from the image of the first surface component and the image of the second semiconductor surface component; and
    (c) correlating the first set of primitive profiles, the second set of primitive profiles and the difference image to provide a primitive correlation.

16. The method of claim 1 further comprising the step of providing combined primitive profiles.

17. The method of claim 1 further comprising the step of providing combined potential defect objects.

18. A method for semiconductor surface inspection comprising the steps of:
   (a) sequentially scanning a semiconductor surface to obtain an image;
   (b) performing a plurality of primitive characterizations for the images to provide a plurality of primitive profiles and at least one potential defect object;
   (c) integrating the at least one potential defect object and the plurality of primitive profiles to provide at least one combined defect object and at least one combined primitive profile;
   (d) wherein the step of performing a plurality of primitive characterizations comprises performing a sequential labeling characterization of the plurality of sequential images; and
   (e) wherein performing a sequential labeling characterization further comprises determining a medial axis between each pattern component in each image of the plurality of sequential images.

19. The method of claim 18 wherein the step of performing a plurality of primitive characterizations comprises performing a morphological characterization of the plurality of sequential images.

20. The method of claim 19 wherein performing a morphological characterization of the plurality of sequential images further comprises performing a morphological opening operation.

21. The method of claim 18 wherein the step of performing a plurality of primitive characterizations comprises a connectivity analyses of the plurality of sequential images.

22. The method of claim 21 wherein the connectivity analyses further comprises determining objects having objects having a different size and shape than a reference object.

23. A method for semiconductor surface inspection comprising the steps of:
   (a) sequentially scanning a semiconductor surface to obtain an image;
   (b) performing a plurality of primitive characterizations for the images to provide a plurality of primitive profiles and at least one potential defect object;
   (c) integrating the at least one potential defect object and the plurality of primitive profiles to provide at least one combined defect object and at least one combined primitive profile;
   (d) wherein the step of performing a plurality of primitive characterizations comprises performing a sequential labeling characterization of the plurality of sequential images; and
   (e) constructing a histogram profile of medial axes.

24. A method of correlating image information from a first semiconductor surface component and a second semiconductor surface component from a single wafer comprising the steps of:
   (a) providing a first set of primitive profiles for the first semiconductor surface component;
   (b) providing a second set of primitive profiles for the second semiconductor surface component;
   (c) aligning an image of the first semiconductor surface component and aligning an image of the second semiconductor surface component to a corresponding die area;
   (d) computing a first set of potential defect objects from the image of the first semiconductor surface component;
   (e) computing a second set of potential defect objects from the image of the second semiconductor surface component;
   (f) computing a difference image from the image of the first semiconductor surface component and the image of the second semiconductor surface component;
   (g) correlating the first set of primitive profiles, the second set of primitive profiles and the difference image to provide a primitive correlation; and
   (h) correlating the first set of potential defect objects, the second set of potential defect objects and the primitive correlation.

25. The method of claim 24 further comprising the step of providing combined primitive profiles.

26. The method of claim 24 further comprising the step of providing combined potential defect objects.

27. A method for inspecting a semiconductor surface, wherein the semiconductor surface has a first surface component and a second surface component the method comprising the steps of:
   (a) obtaining an image of the first surface component and the second surface component;
   (b) performing a first multimodule maskless primitive characterization for defect detection for the first surface component;
   (c) performing a second multimodule maskless primitive characterization for defect detection for the second surface component; and
   (d) performing a correlation between the first multimodule maskless primitive characterization and the second multimodule maskless primitive characterization;
   (e) computing a potential defect from the image of the semiconductor surface;
   (f) computing an associated confidence for the potential defect;
   (g) performing a truth inquiry to generate a truth result; and
   (h) collecting statistics relating the truth result with the potential defect and the associated confidence.

28. An apparatus for inspecting a semiconductor surface, wherein the semiconductor surface has a first surface component and a second surface component, the apparatus comprising:
   (a) means for obtaining an image of the first surface component and the second surface component;
   (b) means for performing a first multimodule maskless primitive characterization for defect detection for the first surface component connected to receive the image of the first surface component;
   (c) means for performing a second multimodule maskless primitive characterization for defect detection for the second surface component connected to receive the image of the second surface component;
   (d) means for performing a correlation connected to receive the first multimodule maskless primitive characterization and the second multimodule maskless primitive characterization;
   (e) means for computing a potential defect from the image of the semiconductor surface;
   (f) means for computing an associated confidence connected to receive the potential defect;

(g) means for performing a truth inquiry to generate a truth result output; and (h) means for collecting statistics connected to receive the truth result, the potential defect and the associated confidence.

29. The apparatus of claim 28 further comprising a means for performing multiple surface component correlation.

30. The apparatus of claim 29 further comprising a means for defect clustering.

31. The apparatus of claim 30 further comprising a means for pattern artifact rejection.

32. The apparatus of claim 28 further comprising a means for automatic learning.

33. The apparatus of claim 28 further comprising a means for critical defect detection.

34. The apparatus of claim 28 wherein the semiconductor surface comprises a wafer.

35. The apparatus of claim 28 wherein the semiconductor surface comprises a liquid crystal display panel.

36. The apparatus of claim 28 wherein the first surface component comprises a die of a semiconductor wafer.

37. The apparatus of claim 28 wherein the first surface component comprises an active matrix element of a liquid crystal display panel.

38. The apparatus of claim 28 wherein means for obtaining an image performs multiple scans to cover an entire surface of the semiconductor surface.

39. The apparatus of claim 28 further comprising a means for providing a plurality of reference profiles for multimodule maskless primitive characterizations.

40. The apparatus of claim 39 further comprising a means for continuously updating the plurality of reference profiles.

41. An apparatus for semiconductor surface inspection comprising:

(a) means for sequentially scanning a semiconductor surface to obtain an image;

(b) means for performing a plurality of primitive characterizations for the image to provide a plurality of primitive profiles and at least one potential defect object connected to receive the image;

(c) means for integrating connected to receive the at least one potential defect object and the plurality of primitive profiles to provide at least one combined defect object and at least one combined primitive profile;

(d) wherein the means for performing a plurality of primitive characterizations further comprises a means for performing a sequential labeling characterization of the plurality of sequential images; and (e) wherein the means for performing a sequential labeling characterization further comprises a means for determining a medial axis between each pattern component in each image of the plurality of sequential images.

42. The apparatus of claim 41 wherein the means for performing a plurality of primitive characterizations further comprises a means for performing a morphological characterization of the plurality of sequential images.

43. The apparatus of claim 42 wherein the means for performing a morphological characterization of the plurality of sequential images further comprises a means for performing a morphological opening operation.

44. The apparatus of claim 41 wherein the means for performing a plurality of primitive characterizations further comprises a means for performing a connectivity analyses of the plurality of sequential images.

45. The apparatus of claim 44 wherein the means for performing a connectivity analysis further comprises a means for determining objects having objects having a different size and shape than a reference object.

46. An apparatus for semiconductor surface inspection comprising:

(a) means for sequentially scanning a semiconductor surface to obtain an image;

(b) means for performing a plurality of primitive characterizations for the image to provide a plurality of primitive profiles and at least one potential defect object connected to receive the image; and (c) means for integrating connected to receive the at least one potential defect object and the plurality of primitive profiles to provide at least one combined defect object and at least one combined primitive profile;

(d) wherein the means for performing a plurality of primitive characterizations further comprises a means for performing a morphological characterization of the plurality of sequential images;

(e) wherein the means for performing a morphological characterization of the plurality of sequential images further comprises a means for performing a morphological opening operation; and wherein the means for performing a morphological characterization further comprises a means for constructing a histogram profile of medial axes.

47. An apparatus for inspecting a semiconductor surface, wherein the semiconductor surface has a first surface component and a second surface component, the apparatus comprising:

(a) means for obtaining an image of the first surface component and the second surface component;

(b) means for performing a first multimodule maskless primitive characterization for defect detection for the first surface component connected to receive the image of the first surface component;

(c) means for performing a second multimodule maskless primitive characterization for defect detection for the second surface component connected to receive the image of the second surface component;

(d) means for performing a correlation connected to receive the first multimodule maskless primitive characterization and the second multimodule maskless primitive characterization; and wherein the means for performing a correlation between the first multimodule maskless primitive characterization from a first semiconductor surface component and the second multimodule maskless primitive characterization from a second semiconductor surface component further comprises:

(i) means for providing a first set of primitive profiles for the first semiconductor surface component;

(ii) means for providing a second set of primitive profiles for the second semiconductor surface component;

(iii) first means for computing a first set of potential defect objects connected to receive the image of the first semiconductor surface component;

(iv) second means for computing a second set of potential defect objects connected to receive the image of the second semiconductor surface component;

(v) first means for correlating connected to receive the first set of primitive profiles and the second set of primitive profiles to provide a primitive correlation; and (vi) second means for correlating connected to receive the first set of potential defect objects, the second set of potential defect objects and the primitive correlation.

48. An apparatus for inspecting a semiconductor surface, wherein the semiconductor surface has a first surface component and a second surface component, the apparatus comprising:
    (a) means for obtaining an image of the first surface component and the second surface component:
    (b) means for performing a first multimodule maskless primitive characterization for defect detection for the first surface component connected to receive the image of the first surface component;
    (c) means for performing a second multimodule maskless primitive characterization for defect detection for the second surface component connected to receive the image of the second surface component; and
    (d) means for performing a correlation connected to receive the first multimodule maskless primitive characterization and the second multimodule maskless primitive characterization; and
        (i) means for aligning the image of the first surface component with the image of the second surface component;
        (ii) means for computing a difference image from the image of the first surface component and the image of the second surface component; and
        (iii) means for correlating connected to receive the first set of primitive profiles, the second set of primitive profiles and the difference image to provide a primitive correlation.

49. An apparatus for inspecting a semiconductor surface, wherein the semiconductor surface has a first surface component and a second surface component the apparatus comprising:
    (a) means for obtaining an image of the first surface component and the second surface component;
    (b) means for performing a first multimodule maskless primitive characterization for defect detection for the first surface component connected to receive the image of the first surface component;
    (c) means for performing a second multimodule maskless primitive characterization for defect detection for the second surface component connected to receive the image of the second surface component; and
    (d) means for performing a correlation connected to receive the first multimodule maskless primitive characterization and the second multimodule maskless primitive characterization;
    (e) a means for performing multiple surface component correlation,
    wherein the means for performing multiple surface component correlation further comprises:
        (i) means for providing the primitive profiles for a semiconductor surface component,
        (ii) means for providing the reference primitive profiles for the semiconductor surface.
        (iii) means for providing a set of potential defect objects with confidence values from the image of the semiconductor surface component;
        (iv) first means for correlating connected to receive the primitive profiles, reference primitive profiles to provide a primitive correlation; and
        (v) second means for correlating connected to receive the potential defect objects and the primitive correlation to update defect confidences; and
    (f) a means for providing combined primitive profiles.

50. An apparatus for inspecting a semiconductor surface, wherein the semiconductor surface has a first surface component and a second surface component, the apparatus comprising:
    (a) means for obtaining an image of the first surface component and the second surface component;
    (b) means for performing a first multimodule maskless primitive characterization for defect detection for the first surface component connected to receive the image of the first surface component;
    (c) means for performing a second multimodule maskless primitive characterization for defect detection for the second surface component connected to receive the image of the second surface component; and
    (d) means for performing a correlation connected to receive the first multimodule maskless primitive characterization and the second multimodule maskless primitive characterization;
    (e) a means for performing multiple surface component correlation,
    wherein the means for performing multiple surface component correlation further comprises:
        (i) means for providing primitive profiles for a semiconductor surface component;
        (ii) means for providing reference primitive profiles for the semiconductor surface;
        (iii) means for providing a set of potential defect objects with confidence values from the image of the semiconductor surface component;
        (iv) first means for correlating connected to receive the primitive profiles, reference primitive profiles to provide a primitive correlation; and
        (v) second means for correlating connected to receive the potential defect objects and the primitive correlation to update defect confidences: and
    (f) a means for providing combined potential defect objects.

51. An apparatus for correlating image information from a first semiconductor surface component and a second semiconductor surface component from a single semiconductor surface comprising:
    (a) means for providing a first set of primitive profiles for the first semiconductor surface component;
    (b) means for providing a second set of primitive profiles for the second semiconductor surface component;
    (c) means for aligning the image of the first semiconductor surface component to a corresponding die area connected to receive the image information;
    (d) means for aligning the image of the second semiconductor surface component to the corresponding die area connected to receive the image information;
    (e) means for computing a first set of potential defect objects connected to receive the image information from the first semiconductor surface component;
    (f) means for computing a second set of potential defect objects connected to receive the image information from the second semiconductor surface component;

(g) means for computing a difference image connected to receive the image information from the first semiconductor surface component and the image information from the second semiconductor surface component;

(h) first means for correlating connected to receive the first set of primitive profiles, the second set of primitive profiles and the difference image to provide a primitive correlation; and (i) second means for correlating connected to receive the first set of potential defect objects, the second set of potential defect objects and the primitive correlation.

52. The apparatus of claim 51 further comprising a means for providing combined primitive profiles.

53. The apparatus of claim 51 further comprising a means for providing combined potential defect objects.

* * * * *